US012770145B2

(12) United States Patent
Das et al.

(10) Patent No.: US 12,770,145 B2
(45) Date of Patent: Oct. 20, 2026

(54) METHOD, SYSTEM, AND COMPUTER PROGRAM PRODUCT FOR COMMUNITY DETECTION

(71) Applicant: Visa International Service Association, San Francisco, CA (US)

(72) Inventors: Mahashweta Das, Campbell, CA (US); Anurag Tangri, Burlingame, CA (US); Chiranjeet Chetia, Round Rock, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/712,423

(22) PCT Filed: Nov. 17, 2022

(86) PCT No.: PCT/US2022/050203

§ 371 (c)(1),
(2) Date: May 22, 2024

(87) PCT Pub. No.: WO2023/096810

PCT Pub. Date: Jun. 1, 2023

(65) Prior Publication Data

US 2025/0005571 A1 Jan. 2, 2025

Related U.S. Application Data

(60) Provisional application No. 63/282,735, filed on Nov. 24, 2021.

(51) Int. Cl.

| | |
|---|---|
| ***G06Q 20/40*** | (2012.01) |
| ***G06F 16/901*** | (2019.01) |
| ***G06F 16/906*** | (2019.01) |

(52) U.S. Cl.
CPC ....... *G06Q 20/401* (2013.01); *G06F 16/9024* (2019.01); *G06F 16/906* (2019.01)

(58) Field of Classification Search
CPC .. G06Q 20/401; G06F 16/906; G06F 16/9024
See application file for complete search history.

(56) References Cited

U.S. PATENT DOCUMENTS 10,505,963 B1 * 12/2019 Zaslavsky ............. H04W 12/12
2005/0222929 A1 10/2005 Steier et al.
(Continued)

OTHER PUBLICATIONS

Blondel et al., "Fast unfolding of communities in large networks", Journal of statistical mechanics: theory and experiment, 2008, No. 10.
(Continued)

*Primary Examiner* — Raven E Yono
(74) *Attorney, Agent, or Firm* — The Webb Law Firm

(57) ABSTRACT

Methods, systems, and computer program products for community detection: (i) obtain a plurality of node embeddings associated with a graph; (ii) determine a number of clusters into which the plurality of node embeddings is to be clustered; (iii) cluster, based on distances between pairs of node embeddings, the plurality of node embeddings into the number of clusters until, for each node embedding in each cluster, a node associated with that node embedding is within k-hops in the graph of each other node associated with each other node embedding in that cluster; (iv) reposition centroids of the number of clusters; (v) repeat steps (iii) and (iv) until a first stopping criteria is satisfied; (vi) repeat steps (ii) through (v) until a second stopping criteria that depends on a conductance of a clustering including the number of clusters is satisfied; and (vii) provide the clustering including the number of clusters.

3 Claims, 12 Drawing Sheets

(56) References Cited

U.S. PATENT DOCUMENTS

| | | | | |
|---|---|---|---|---|
| 2008/0010304 | A1* | 1/2008 | Vempala | G06F 16/322 |
| 2012/0239479 | A1* | 9/2012 | Amaro | G06Q 10/40 709/204 |
| 2013/0124524 | A1 | 5/2013 | Anderson | |
| 2016/0321705 | A1* | 11/2016 | Scheidelman | G06F 40/20 |
| 2016/0364794 | A1 | 12/2016 | Chari et al. | |
| 2021/0334822 | A1 | 10/2021 | Pati et al. | |

OTHER PUBLICATIONS

Clauset et al., "Finding community structure in very large networks", Physical review E, 2004, pp. pp. 1-6, vol. 70, No. 6.

Cleuziou et al., "An extended version of the k-means method for overlapping clustering", 2008 19th International Conference on Pattern Recognition, IEEE, 2008, pp. 1-4.

Goyal et al., "Graph embedding techniques, applications, and performance: A survey", Knowledge-Based Systems, 2018, pp. 78-94, vol. 151.

Li et al., "Convex relaxation methods for community detection", 2021, pp. 1-22.

Moscato et al., "Community detection based on game theory", Engineering Applications of Artificial Intelligence, 2019, pp. 773-782, vol. 85.

Pons et al., "Computing communities in large networks using random walks", Computer and Information Sciences—ISCIS 2005: 20th International Symposium, Istanbul, Turkey, Oct. 26-28, 2005. Proceedings 20. Springer Berlin Heidelberg, 2005, pp. 284-293.

Qing et al., "Consistency of spectral clustering for directed network community detection", arXiv preprint arXiv:2109.10319 (2021).

Rosvall et al., "Maps of random walks on complex networks reveal community structure", Proceedings of the national academy of sciences, 2008, pp. 1118-1123, vol. 105, No. 4.

Tandon et al., "Community detection in networks using graph embeddings", Physical Review E, 2021, pp. 1-16, vol. 103, No. 2.

Traag et al., "From Louvain to Leiden: guaranteeing well-connected communities", Scientific reports, 2019, pp. 1-12, vol. 9, No. 1.

White et al., "A spectral clustering approach to finding communities in graphs", Proceedings of the 2005 SIAM international conference on data mining, Society for industrial and applied Mathematics, 2005, pp. 274-285.

Wu et al., "Deep learning techniques for community detection in social networks", IEEE Access, 2020, pp. 96016-96026, vol. 8.

Latulipe et al., "A CS1 Team-Based Learning Space in Gather. Town", 26th International Conference on Intelligent User Interfaces, 2021, p. 1245.

"K-means clustering—Wikipedia", 2018, accessed at <https://en.wikipedia.org/w/index.php?title=K-means_clustering&oldid=852940613>.

* cited by examiner

METHOD, SYSTEM, AND COMPUTER PROGRAM PRODUCT FOR COMMUNITY DETECTION

CROSS-REFERENCE TO RELATED APPLICATIONS

This application is the United States national phase of International Application No. PCT/US2022/50203 filed Nov. 17, 2022, and claims priority to U.S. Provisional Patent Application No. 63/282,735, filed on Nov. 24, 2021, the disclosures of which are incorporated by reference herein in their entireties.

BACKGROUND

1. Technical Field

This disclosure relates to community detection and, in some non-limiting embodiments or aspects, to methods, systems, and computer program products for community detection for detecting suspicious nodes and/or paths partaking in financial crimes.

2. Technical Considerations

The rapid adoption of real-time payment (RTP) systems and peer-to-peer payment (P2P) systems around the world has contributed to an environment in which consumers, businesses, and/or financial institutions are able to pay (e.g., transfer money, settle bills, etc.) friends, customers, and/or merchants instantaneously or near instantaneously. The growing ubiquity of smart devices and thriving e-commerce businesses, especially during the pandemic, has accelerated the expansion of RTP and P2P. RTP systems allow participants (e.g., consumers, businesses, etc.) to send and receive funds instantaneously. P2P systems allow participants (e.g., consumers, businesses, etc.) to send and receive funds from mobile devices faster—may not be instantaneously. Such faster payment infrastructures and real-time capabilities may potentially expose sensitive data of participants to faster attacks and vulnerabilities, which may necessitate design and development of advanced artificial intelligence (AI) models to detect fraud and keep up with evolving threats. Preventing or reducing fraud and money laundering in such fast payment networks is challenging because of several reasons including shortened time windows to identify and stop suspicious payments; vulnerabilities unique to such payment networks such as identity threats, phishing scams, money mule frauds, and/or the like; continuously evolving fraud trends; additional compliance flagging for money laundering, terrorism financing, and/or the like; and greater volume, overall, of digital transactions.

SUMMARY

Accordingly, provided are improved systems, devices, products, apparatus, and/or methods for community detection.

According to some non-limiting embodiments or aspects, provided is a computer-implemented method, including: (i) obtaining, with at least one processor, a plurality of node embeddings associated with a graph including a plurality of edges and a plurality of nodes for the plurality of edges, wherein the plurality of nodes is associated with a plurality of entities, and wherein the plurality of edges is associated with a plurality of relationships between the plurality of entities; (ii) determining, with the at least one processor, a number of clusters into which the plurality of node embeddings is to be clustered; (iii) clustering, with the at least one processor, based on distances between pairs of node embeddings in the plurality of node embeddings, the plurality of node embeddings into the number of clusters until, for each node embedding in each cluster, a node associated with that node embedding is within k-hops in the graph of each other node associated with each other node embedding in that cluster; (iv) repositioning, with the at least one processor, centroids of the number of clusters; (v) repeating, with the at least one processor, steps (iii) and (iv) until a first stopping criteria is satisfied; (vi) repeating, with the at least one processor, steps (ii) through (v) until a second stopping criteria that depends on a conductance of a clustering including the number of clusters is satisfied, wherein the conductance of the clustering includes a maximum conductance over each cluster in the clustering; and (vii) providing, with the at least one processor, the clustering including the number of clusters.

In some non-limiting embodiments or aspects, the method further includes: obtaining, with the at least one processor, prior transaction data associated with a plurality of prior transactions between the plurality of entities; generating, with the at least one processor, based on the prior transaction data, the graph, wherein the plurality of entities is associated with a plurality of accounts in a payment network; and generating, with the at least one processor, based on the graph, the plurality of node embeddings.

In some non-limiting embodiments or aspects, the method further includes: receiving, with the at least one processor, current transaction data associated with a current transaction associated with an account in the payment network; providing, with the at least one processor, as input to a machine learning model, at least one metric associated with a cluster of the number of clusters in which a node embedding associated with the account is clustered; receiving, with the at least one processor, as output from the machine learning model, a prediction associated with the current transaction; and authorizing or denying, with the at least one processor, based on the prediction, the current transaction.

In some non-limiting embodiments or aspects, the at least one metric includes at least one of the following metrics: a number of accounts associated with the cluster, a monetary amount of transactions associated with the accounts associated with the cluster, a number of transactions associated with the accounts associated with the cluster, a community activity score determined based on transaction amounts and transaction counts associated with the accounts associated with the cluster, a community recency score determined based on an average age of the accounts associated with the cluster, a community instability score determined based on a percentage of the accounts that are consistent in the cluster over a period of time, or any combination thereof.

In some non-limiting embodiments or aspects, the payment network includes at least one of a real-time payment (RTP) network, a peer-to-peer (P2P) payment network, or any combination thereof.

In some non-limiting embodiments or aspects, the second stopping criteria is satisfied when the conductance of each cluster in the clustering is at least a threshold conductance and a weight of inter-cluster edges is at most a threshold fraction of a total weight of each of the edges in the graph.

In some non-limiting embodiments or aspects, the first stopping criteria is satisfied when no node embeddings change clusters in step (iii) from a previous iteration of step (iii).

According to some non-limiting embodiments or aspects, provided is a system, including: at least one processor programmed and/or configured to: (i) obtain a plurality of node embeddings associated with a graph including a plurality of edges and a plurality of nodes for the plurality of edges, wherein the plurality of nodes is associated with a plurality of entities, and wherein the plurality of edges is associated with a plurality of relationships between the plurality of entities; (ii) determine a number of clusters into which the plurality of node embeddings is to be clustered; (iii) cluster, based on distances between pairs of node embeddings in the plurality of node embeddings, the plurality of node embeddings into the number of clusters until, for each node embedding in each cluster, a node associated with that node embedding is within k-hops in the graph of each other node associated with each other node embedding in that cluster; (iv) reposition centroids of the number of clusters; (v) repeat steps (iii) and (iv) until a first stopping criteria is satisfied; (vi) repeat steps (ii) through (v) until a second stopping criteria that depends on a conductance of a clustering including the number of clusters is satisfied, wherein the conductance of the clustering includes a maximum conductance over each cluster in the clustering; and (vii) provide the clustering including the number of clusters.

In some non-limiting embodiments or aspects, the at least one processor is further programmed and/or configured to: obtain prior transaction data associated with a plurality of prior transactions between the plurality of entities; generate, based on the prior transaction data, the graph, wherein the plurality of entities is associated with a plurality of accounts in a payment network; and generate, based on the graph, the plurality of node embeddings.

In some non-limiting embodiments or aspects, the at least one processor is further programmed and/or configured to: receive current transaction data associated with a current transaction associated with an account in the payment network; provide, as input to a machine learning model, at least one metric associated with a cluster of the number of clusters in which a node embedding associated with the account is clustered; receive, as output from the machine learning model, a prediction associated with the current transaction; and authorize or deny, based on the prediction, the current transaction.

In some non-limiting embodiments or aspects, the at least one metric includes at least one of the following metrics: a number of accounts associated with the cluster, a monetary amount of transactions associated with the accounts associated with the cluster, a number of transactions associated with the accounts associated with the cluster, a community activity score determined based on transaction amounts and transaction counts associated with the accounts associated with the cluster, a community recency score determined based on an average age of the accounts associated with the cluster, a community instability score determined based on a percentage of the accounts that are consistent in the cluster over a period of time, or any combination thereof.

In some non-limiting embodiments or aspects, the payment network includes at least one of a real-time payment (RTP) network, a peer-to-peer (P2P) payment network, or any combination thereof.

In some non-limiting embodiments or aspects, the second stopping criteria is satisfied when the conductance of each cluster in the clustering is at least a threshold conductance and a weight of inter-cluster edges is at most a threshold fraction of a total weight of each of the edges in the graph.

In some non-limiting embodiments or aspects, the first stopping criteria is satisfied when no node embeddings change clusters in step (iii) from a previous iteration of step (iii).

According to some non-limiting embodiments or aspects, provided is a computer program product comprising at least one non-transitory computer-readable medium including program instructions that, when executed by at least one processor, cause the at least one processor to: (i) obtain a plurality of node embeddings associated with a graph including a plurality of edges and a plurality of nodes for the plurality of edges, wherein the plurality of nodes is associated with a plurality of entities, and wherein the plurality of edges is associated with a plurality of relationships between the plurality of entities; (ii) determine a number of clusters into which the plurality of node embeddings is to be clustered; (iii) cluster, based on distances between pairs of node embeddings in the plurality of node embeddings, the plurality of node embeddings into the number of clusters until, for each node embedding in each cluster, a node associated with that node embedding is within k-hops in the graph of each other node associated with each other node embedding in that cluster; (iv) reposition centroids of the number of clusters; (v) repeat steps (iii) and (iv) until a first stopping criteria is satisfied; (vi) repeat steps (ii) through (v) until a second stopping criteria that depends on a conductance of a clustering including the number of clusters is satisfied, wherein the conductance of the clustering includes a maximum conductance over each cluster in the clustering; and (vii) provide the clustering including the number of clusters.

In some non-limiting embodiments or aspects, the program instructions, when executed by the at least one processor, further cause the at least one processor to: obtain prior transaction data associated with a plurality of prior transactions between the plurality of entities; generate, based on the prior transaction data, the graph, wherein the plurality of entities is associated with a plurality of accounts in a payment network; and generate, based on the graph, the plurality of node embeddings.

In some non-limiting embodiments or aspects, the program instructions, when executed by the at least one processor, further cause the at least one processor to: receive current transaction data associated with a current transaction associated with an account in the payment network; provide, as input to a machine learning model, at least one metric associated with a cluster of the number of clusters in which a node embedding associated with the account is clustered; receive, as output from the machine learning model, a prediction associated with the current transaction; and authorize or deny, based on the prediction, the current transaction.

In some non-limiting embodiments or aspects, the at least one metric includes at least one of the following metrics: a number of accounts associated with the cluster, a monetary amount of transactions associated with the accounts associated with the cluster, a number of transactions associated with the accounts associated with the cluster, a community activity score determined based on transaction amounts and transaction counts associated with the accounts associated with the cluster, a community recency score determined based on an average age of the accounts associated with the cluster, a community instability score determined based on a percentage of the accounts that are consistent in the cluster over a period of time, or any combination thereof.

In some non-limiting embodiments or aspects, the payment network includes at least one of a real-time payment (RTP) network, a peer-to-peer (P2P) payment network, or any combination thereof.

In some non-limiting embodiments or aspects, the second stopping criteria is satisfied when the conductance of each cluster in the clustering is at least a threshold conductance and a weight of inter-cluster edges is at most a threshold fraction of a total weight of each of the edges in the graph, and wherein the first stopping criteria is satisfied when no node embeddings change clusters in step (iii) from a previous iteration of step (iii).

Further non-limiting embodiments or aspects are set forth in the following numbered clauses:

Clause 1. A computer-implemented method, comprising: (i) obtaining, with at least one processor, a plurality of node embeddings associated with a graph including a plurality of edges and a plurality of nodes for the plurality of edges, wherein the plurality of nodes is associated with a plurality of entities, and wherein the plurality of edges is associated with a plurality of relationships between the plurality of entities; (ii) determining, with the at least one processor, a number of clusters into which the plurality of node embeddings is to be clustered; (iii) clustering, with the at least one processor, based on distances between pairs of node embeddings in the plurality of node embeddings, the plurality of node embeddings into the number of clusters until, for each node embedding in each cluster, a node associated with that node embedding is within k-hops in the graph of each other node associated with each other node embedding in that cluster; (iv) repositioning, with the at least one processor, centroids of the number of clusters; (v) repeating, with the at least one processor, steps (iii) and (iv) until a first stopping criteria is satisfied; (vi) repeating, with the at least one processor, steps (ii) through (v) until a second stopping criteria that depends on a conductance of a clustering including the number of clusters is satisfied, wherein the conductance of the clustering includes a maximum conductance over each cluster in the clustering; and (vii) providing, with the at least one processor, the clustering including the number of clusters.

Clause 2. The computer-implemented method of clause 1, further comprising: obtaining, with the at least one processor, prior transaction data associated with a plurality of prior transactions between the plurality of entities; generating, with the at least one processor, based on the prior transaction data, the graph, wherein the plurality of entities is associated with a plurality of accounts in a payment network; and generating, with the at least one processor, based on the graph, the plurality of node embeddings.

Clause 3. The computer-implemented method of clauses 1 or 2, further comprising: receiving, with the at least one processor, current transaction data associated with a current transaction associated with an account in the payment network; providing, with the at least one processor, as input to a machine learning model, at least one metric associated with a cluster of the number of clusters in which a node embedding associated with the account is clustered; receiving, with the at least one processor, as output from the machine learning model, a prediction associated with the current transaction; and authorizing or denying, with the at least one processor, based on the prediction, the current transaction.

Clause 4. The computer-implemented method of any of clauses 1-3, wherein the at least one metric includes at least one of the following metrics: a number of accounts associated with the cluster, a monetary amount of transactions associated with the accounts associated with the cluster, a number of transactions associated with the accounts associated with the cluster, a community activity score determined based on transaction amounts and transaction counts associated with the accounts associated with the cluster, a community recency score determined based on an average age of the accounts associated with the cluster, a community instability score determined based on a percentage of the accounts that are consistent in the cluster over a period of time, or any combination thereof.

Clause 5. The computer-implemented method of any of clauses 1-4, wherein the payment network includes at least one of a real-time payment (RTP) network, a peer-to-peer (P2P) payment network, or any combination thereof.

Clause 6. The computer-implemented method of any of clauses 1-5, wherein the second stopping criteria is satisfied when the conductance of each cluster in the clustering is at least a threshold conductance and a weight of inter-cluster edges is at most a threshold fraction of a total weight of each of the edges in the graph.

Clause 7. The computer-implemented method of any of clauses 1-6, wherein the first stopping criteria is satisfied when no node embeddings change clusters in step (iii) from a previous iteration of step (iii).

Clause 8. A system, comprising: at least one processor programmed and/or configured to: (i) obtain a plurality of node embeddings associated with a graph including a plurality of edges and a plurality of nodes for the plurality of edges, wherein the plurality of nodes is associated with a plurality of entities, and wherein the plurality of edges is associated with a plurality of relationships between the plurality of entities; (ii) determine a number of clusters into which the plurality of node embeddings is to be clustered; (iii) cluster, based on distances between pairs of node embeddings in the plurality of node embeddings, the plurality of node embeddings into the number of clusters until, for each node embedding in each cluster, a node associated with that node embedding is within k-hops in the graph of each other node associated with each other node embedding in that cluster; (iv) reposition centroids of the number of clusters; (v) repeat steps (iii) and (iv) until a first stopping criteria is satisfied; (vi) repeat steps (ii) through (v) until a second stopping criteria that depends on a conductance of a clustering including the number of clusters is satisfied, wherein the conductance of the clustering includes a maximum conductance over each cluster in the clustering; and (vii) provide the clustering including the number of clusters.

Clause 9. The system of clause 8, wherein the at least one processor is further programmed and/or configured to: obtain prior transaction data associated with a plurality of prior transactions between the plurality of entities; generate, based on the prior transaction data, the graph, wherein the plurality of entities is associated with a plurality of accounts in a payment network; and generate, based on the graph, the plurality of node embeddings.

Clause 10. The system of clauses 8 or 9, wherein the at least one processor is further programmed and/or configured to: receive current transaction data associated with a current transaction associated with an account in the payment network; provide, as input to a machine learning model, at least one metric associated with a cluster of the number of clusters in which a node embedding associated with the account is clustered; receive, as output from the machine learning model, a prediction associated with the current transaction; and authorize or deny, based on the prediction, the current transaction.

Clause 11. The system of any of clauses 8-10, wherein the at least one metric includes at least one of the following metrics: a number of accounts associated with the cluster, a monetary amount of transactions associated with the accounts associated with the cluster, a number of transactions associated with the accounts associated with the cluster, a community activity score determined based on transaction amounts and transaction counts associated with the accounts associated with the cluster, a community recency score determined based on an average age of the accounts associated with the cluster, a community instability score determined based on a percentage of the accounts that are consistent in the cluster over a period of time, or any combination thereof.

Clause 12. The system of any of clauses 8-11, wherein the payment network includes at least one of a real-time payment (RTP) network, a peer-to-peer (P2P) payment network, or any combination thereof.

Clause 13. The system of any of clauses 8-12, wherein the second stopping criteria is satisfied when the conductance of each cluster in the clustering is at least a threshold conductance and a weight of inter-cluster edges is at most a threshold fraction of a total weight of each of the edges in the graph.

Clause 14. The system of any of clauses 8-13, wherein the first stopping criteria is satisfied when no node embeddings change clusters in step (iii) from a previous iteration of step (iii).

Clause 15. A computer program product comprising at least one non-transitory computer-readable medium including program instructions that, when executed by at least one processor, cause the at least one processor to: (i) obtain a plurality of node embeddings associated with a graph including a plurality of edges and a plurality of nodes for the plurality of edges, wherein the plurality of nodes is associated with a plurality of entities, and wherein the plurality of edges is associated with a plurality of relationships between the plurality of entities; (ii) determine a number of clusters into which the plurality of node embeddings is to be clustered; (iii) cluster, based on distances between pairs of node embeddings in the plurality of node embeddings, the plurality of node embeddings into the number of clusters until, for each node embedding in each cluster, a node associated with that node embedding is within k-hops in the graph of each other node associated with each other node embedding in that cluster; (iv) reposition centroids of the number of clusters; (v) repeat steps (iii) and (iv) until a first stopping criteria is satisfied; (vi) repeat steps (ii) through (v) until a second stopping criteria that depends on a conductance of a clustering including the number of clusters is satisfied, wherein the conductance of the clustering includes a maximum conductance over each cluster in the clustering; and (vii) provide the clustering including the number of clusters.

Clause 16. The computer program product of clause 15, wherein the program instructions, when executed by the at least one processor, further cause the at least one processor to: obtain prior transaction data associated with a plurality of prior transactions between the plurality of entities; generate, based on the prior transaction data, the graph, wherein the plurality of entities is associated with a plurality of accounts in a payment network; and generate, based on the graph, the plurality of node embeddings.

Clause 17. The computer program product of clauses 15 or 16, wherein the program instructions, when executed by the at least one processor, further cause the at least one processor to: receive current transaction data associated with a current transaction associated with an account in the payment network; provide, as input to a machine learning model, at least one metric associated with a cluster of the number of clusters in which a node embedding associated with the account is clustered; receive, as output from the machine learning model, a prediction associated with the current transaction; and authorize or deny, based on the prediction, the current transaction.

Clause 18. The computer program product of any of clauses 15-17, wherein the at least one metric includes at least one of the following metrics: a number of accounts associated with the cluster, a monetary amount of transactions associated with the accounts associated with the cluster, a number of transactions associated with the accounts associated with the cluster, a community activity score determined based on transaction amounts and transaction counts associated with the accounts associated with the cluster, a community recency score determined based on an average age of the accounts associated with the cluster, a community instability score determined based on a percentage of the accounts that are consistent in the cluster over a period of time, or any combination thereof.

Clause 19. The computer program product of any of clauses 15-18, wherein the payment network includes at least one of a real-time payment (RTP) network, a peer-to-peer (P2P) payment network, or any combination thereof.

Clause 20. The computer program product of any of clauses 15-19, wherein the second stopping criteria is satisfied when the conductance of each cluster in the clustering is at least a threshold conductance and a weight of inter-cluster edges is at most a threshold fraction of a total weight of each of the edges in the graph, and wherein the first stopping criteria is satisfied when no node embeddings change clusters in step (iii) from a previous iteration of step (iii).

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DETAILED DESCRIPTION

Figure 1:
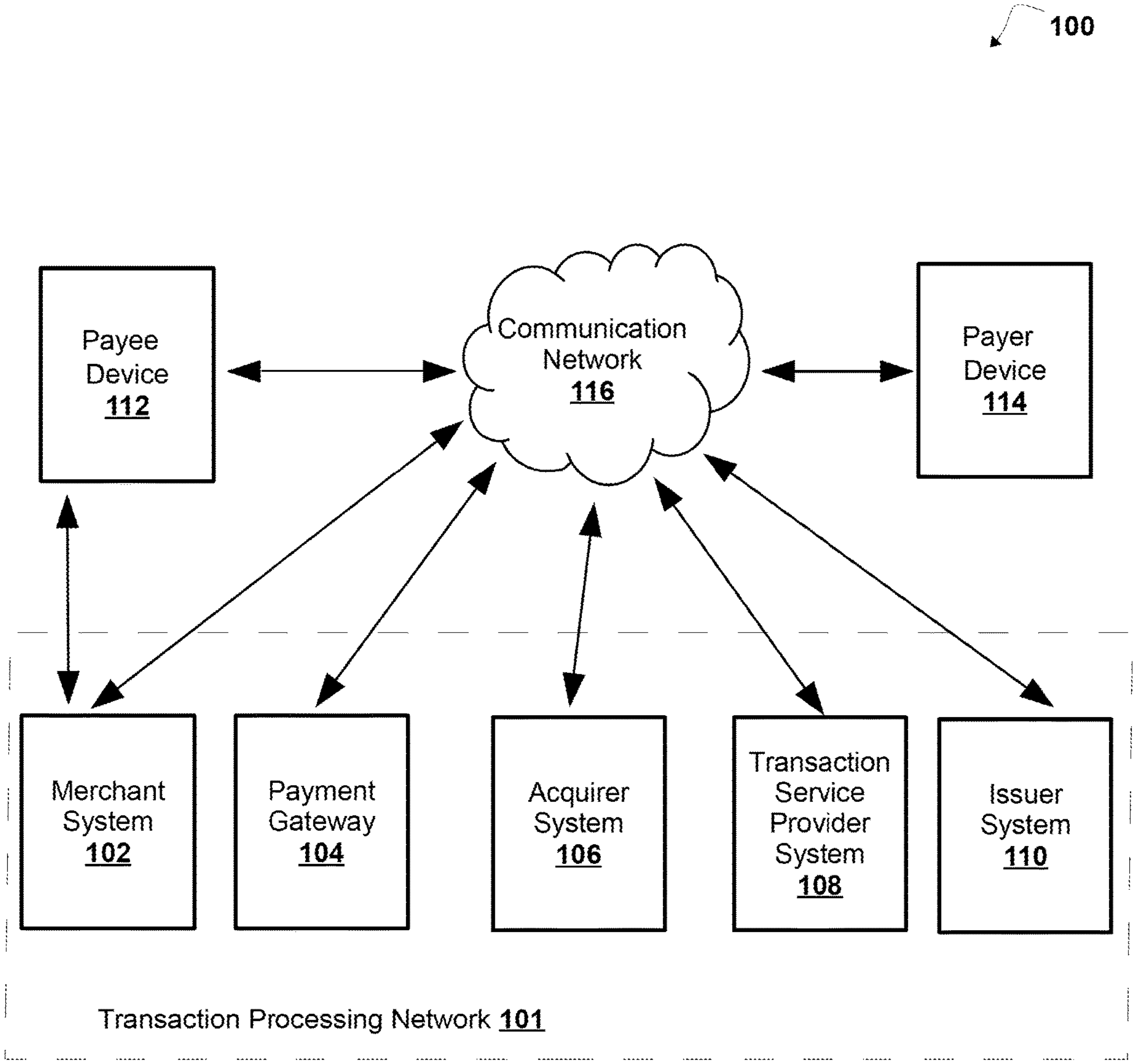
FIG. 1 is a diagram of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a PAN, to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein, the term "issuer institution system"

may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides goods and/or services, or access to goods and/or services, to users (e.g. customers) based on a transaction (e.g. a payment transaction). As used herein, the terms "merchant" or "merchant system" may also refer to one or more computer systems, computing devices, and/or software application operated by or on behalf of a merchant, such as a server computer executing one or more software applications. A "point-of-sale (POS) system," as used herein, may refer to one or more computers and/or peripheral devices used by a merchant to engage in payment transactions with users, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction. A POS system may be part of a merchant system. A merchant system may also include a merchant plug-in for facilitating online, Internet-based transactions through a merchant webpage or software application. A merchant plug-in may include software that runs on a merchant server or is hosted by a third-party for facilitating such online transactions.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the term "payment device" may refer to a portable financial device, an electronic payment device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computer, an access card, a wireless terminal, a transponder, and/or the like. In some non-limiting embodiments or aspects, the payment device may include volatile or nonvolatile memory to store information (e.g., an account identifier, a name of the account holder, and/or the like).

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway" may refer to one or more computer systems, computer devices, servers, groups of servers, and/or the like operated by or on behalf of a payment gateway.

As used herein, the terms "authenticating system" and "authentication system" may refer to one or more computing devices that authenticate a user and/or an account, such as but not limited to a transaction processing system, merchant system, issuer system, payment gateway, a third-party authenticating service, and/or the like.

As used herein, the terms "request," "response," "request message," and "response message" may refer to one or more messages, data packets, signals, and/or data structures used to communicate data between two or more components or units.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

As used herein, the terms "peer-to-peer payment transfer service" and "peer-to-peer payment transfer application" refer to one or more electronic devices and/or software applications configured to initiate and/or conduct person-to-person (e.g., account-to-account, etc.) transfers of payments or funds. For example, a peer-to-peer payment transfer service may include mobile devices executing a peer-to-peer payment transfer application, and may further include server-side software and/or databases (e.g., a payee database, a payer database, etc.) for maintaining and providing request data and transaction data to the mobile devices. A "peer-to-peer payment transfer service provider" may include an entity that provides and/or maintains a peer-to-peer payment transfer service for customers, such as Visa Direct®, and/or other like peer-to-peer payment transfer services. In some non-limiting examples, a transaction service provider may be a peer-to-peer payment transfer service provider.

As used herein, the term "real-time payment (RTP)" refers to a method of electronic funds transfer, allowing for almost or near immediate transfer of money between accounts, which is in contrast to the previous transfer times of one to three business days. For example, RTP means a payment transaction is not subjected to any waiting period, with funds being transferred and/or transactions being settled as soon as the payment transactions are processed by the RTP system.

As used herein, the term "real-time" refers to performance of a task or tasks during another process or before another process is completed. For example, a real-time inference may be an inference that is obtained from a model before a payment transaction is authorized, completed, and/or the like.

Community detection is a fundamental problem in network science and has been extensively studied in the literature. A main idea of community detection is to detect groups of nodes in a network that are densely connected among themselves, but sparsely connected to the rest of the network. In spite of a rich body of literature, innovations in community detection are happening to this day. Popular community detection methods in the literature include: Clauset, Newman, and Moore Algorithm, Louvain Algorithm, Leiden Community Detection, Walktrap Community Detection, Spectral Clustering, and InfoMap. However, these existing methods may not be scalable, may not work with skewed networks, may yield arbitrarily badly connected communities, and/or may be unstable for sparse and/or noisy datasets.

Non-limiting embodiments or aspects of the disclosed subject matter are directed to methods, systems, and computer program products for detecting suspicious nodes and/or routes in networks, such as fast payment networks, and/or proactively tracking the suspicious nodes and/or routes. For example, non-limiting embodiments or aspects of the disclosed subject matter provide for community detection that enables detecting suspicious accounts/groups of accounts in payment networks along with risky interactions of the accounts that demonstrate unexpected behavior in terms of transaction volume, transaction amount, burstiness of activities, and/or the like.

To achieve these benefits, non-limiting embodiments or aspects of the disclosed subject matter may (i) obtain a plurality of node embeddings associated with a graph; (ii) determine a number of clusters into which the plurality of node embeddings is to be clustered; (iii) cluster, based on distances between pairs of node embeddings, the plurality of node embeddings into the number of clusters until, for each node embedding in each cluster, a node associated with that node embedding is within k-hops in the graph of each other node associated with each other node embedding in that cluster; (iv) reposition centroids of the number of clusters; (v) repeat steps (iii) and (iv) until a first stopping criteria is satisfied; (vi) repeat steps (ii) through (v) until a second stopping criteria that depends on a conductance of a clustering including the number of clusters is satisfied; and (vii) provide the clustering including the number of clusters.

In this way, non-limiting embodiments or aspects of the disclosed subject matter may provide a community detection framework that seamlessly supports the following functionalities: discovery of non-trivial meaningful communities that are not simply connected components; discovery of overlapping communities; optimization of compactness and connectivity via conductance; leveraging of domain knowledge in order to discover domain-specific communities and their risks; ability to work on heterogeneous graphs; ability to work on large-scale and/or skewed graph data; and/or generation of features that are input to artificial intelligence (AI) fraud models.

Referring now to FIG. 1, FIG. 1 is a diagram of an example environment 100 in which devices, systems, methods, and/or products described herein, may be implemented. As shown in FIG. 1, environment 100 includes transaction processing network 101, which can include merchant system 102, payment gateway 104, acquirer system 106, transaction service provider system 108, and/or issuer system 110, payee device 112, payer device 114, and/or communication network 116. Transaction processing network 101, merchant system 102, payment gateway 104, acquirer system 106, transaction service provider system 108, issuer system 110, payee device 112, and/or payer device 114 may interconnect (e.g., establish a connection to communicate) via wired connections, wireless connections, or a combination of wired and wireless connections.

Merchant system 102 may include one or more devices capable of receiving information from payment gateway 104, acquirer system 106, transaction service provider system 108, issuer system 110, payee device 112, and/or payer device 114 via communication network 116 and/or communicating information to payment gateway 104, acquirer system 106, transaction service provider system 108, issuer system 110, payee device 112, and/or payer device 114 via communication network 116. Merchant system 102 may include a device capable of receiving information from payer device 114 via a communication connection (e.g., an NFC communication connection, an RFID communication connection, a Bluetooth® communication connection, and/or the like) with payee device 112, and/or communicating information to payee device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway 104 may include one or more devices capable of receiving information from merchant system 102, acquirer system 106, transaction service provider system 108, issuer system 110, payee device 112, and/or payer device 114 via communication network 116 and/or communicating information to merchant system 102, acquirer system 106, transaction service provider system 108, issuer system 110, payee device 112, and/or payer device 114 via communication network 116. For example, payment gateway 104 may include a computing device, such as a server, a group of servers, and/or other like devices. In some non-limiting embodiments or aspects, payment gateway 104 is associated with a payment gateway as described herein.

Acquirer system 106 may include one or more devices capable of receiving information from merchant system 102, payment gateway 104, transaction service provider system 108, issuer system 110, payee device 112, and/or payer device 114 via communication network 116 and/or communicating information to merchant system 102, payment gateway 104, transaction service provider system 108, issuer system 110, payee device 112, and/or payer device 114 via communication network 116. For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information from merchant system 102, payment gateway 104, acquirer system 106, issuer system 110, payee device 112, and/or payer device 114 via communication network 116 and/or communicating information to merchant system 102, payment gateway 104, acquirer system 106, issuer system 110, payee device 112, and/or payer device 114 via communication network 116. For example, transaction service provider system 108 may include a computing device, such as a server (e.g., a transaction processing server), a group of servers, and/or other like devices. In some non-limiting embodiments or aspects, transaction service provider system 108 may be associated with a transaction service provider as described herein. In some non-limiting embodiments or aspects, transaction service provider system 108 may be a peer-to-peer payment transfer service provider.

Issuer system 110 may include one or more devices capable of receiving information from merchant system 102, payment gateway 104, acquirer system 106, transaction service provider system 108, payee device 112, and/or payer device 114 via communication network 116 and/or communicating information to merchant system 102, payment gateway 104, acquirer system 106, transaction service provider system 108, payee device 112, and/or payer device 114 via communication network 116. For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a payee associated with payee device 112, a payer associated with payer device 114, etc.).

In some non-limiting embodiments or aspects, transaction processing network 101 includes a plurality of systems in a communication path for processing a transaction. For example, transaction processing network 101 can include merchant system 102, payment gateway 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway 104, acquirer system 106, transaction service provider system 108, and/or issuer system 110.

Payee device 112 may include one or more devices capable of receiving information from merchant system 102, payment gateway 104, acquirer system 106, transaction service provider system 108, issuer system 110, and/or payer device 114 via communication network 116 and/or communicating information to merchant system 102, payment gateway 104, acquirer system 106, transaction service provider system 108, issuer system 110, and/or payer device 114 via communication network 116. For example, payee device 112 may include a client device and/or the like. In some non-limiting embodiments or aspects, payee device 112 may be capable of receiving information (e.g., from merchant system 102) via a short range wireless communication connection (e.g., an NFC communication connection, an RFID communication connection, a Bluetooth® communication connection, and/or the like), and/or communicating information (e.g., to merchant system 102) via a short range wireless communication connection. In some non-limiting embodiments or aspects, payee device 112 may include an application associated with payee device 112, such as an application stored on payee device 112, a mobile application (e.g., a mobile device application, a native application for a mobile device, a mobile cloud application for a mobile device, an electronic wallet application, a peer-to-peer payment transfer application, a real-time payment (RTP) application, and/or the like) stored and/or executed on payee device 112. In some non-limiting embodiments or aspects, a payee is a user associated with payee device 112 and/or a payee account in a peer-to-peer payment transfer service (e.g., an account identifier that uniquely identifies a payee account in the peer-to-peer payment transfer service, etc.).

Payer device 114 may include one or more devices capable of receiving information from merchant system 102, payment gateway 104, acquirer system 106, transaction service provider system 108, issuer system 110, and/or payee device 112 via communication network 116 and/or communicating information to merchant system 102, payment gateway 104, acquirer system 106, transaction service provider system 108, issuer system 110, and/or payee device 112 via communication network 116. For example, payer device 114 may include a client device and/or the like. In some non-limiting embodiments or aspects, payer device 114 may include an application associated with payer device 114, such as an application stored on payer device 114, a mobile application (e.g., a mobile device application, a native application for a mobile device, a mobile cloud application for a mobile device, an electronic wallet application, a peer-to-peer payment transfer application, and/or the like) stored and/or executed on payer device 114. In some non-limiting embodiments or aspects, a payer is a user associated with payer device 114 and/or a payer account in a peer-to-peer payment transfer service (e.g., an account identifier that uniquely identifies a payer account in the peer-to-peer payment transfer service, etc.).

Communication network 116 may include one or more wired and/or wireless networks. For example, communication network 116 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally or alternatively, a set of devices and/or systems (e.g., one or more devices or systems) of environment 100 may perform one or more functions described as being performed by another set of devices and/or systems of environment 100.

Figure 2:
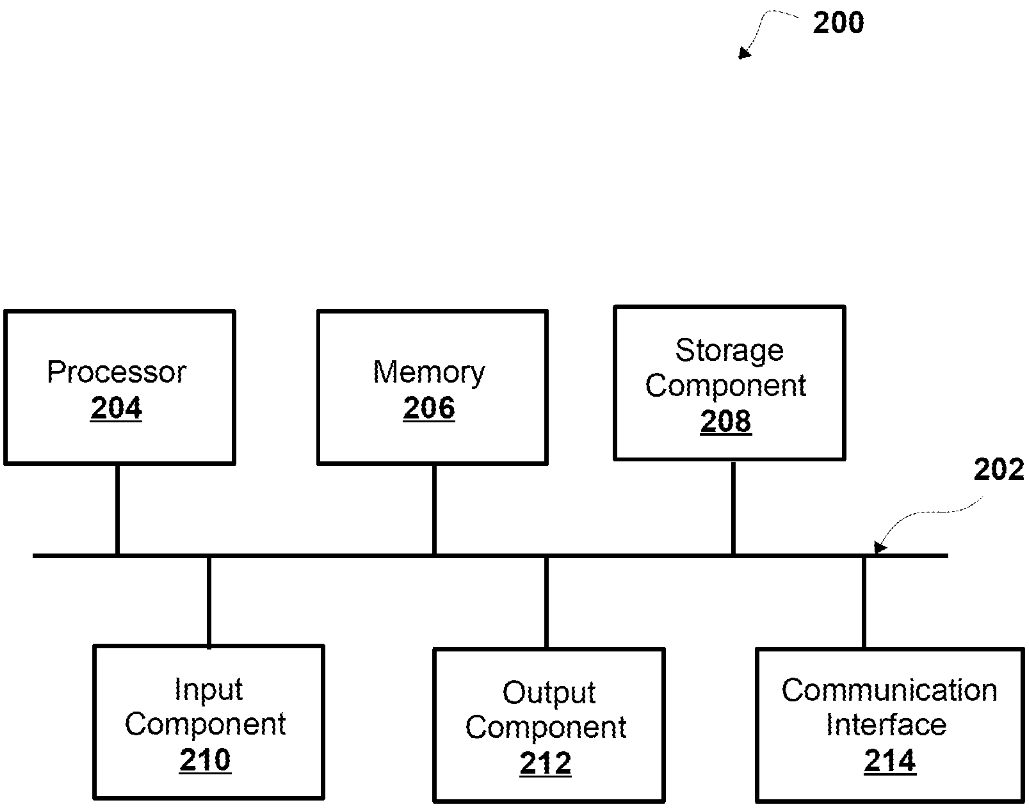
FIG. 2 is a diagram of non-limiting embodiments or aspects of components of one or more devices and/or one or more systems of FIG. 1.

Referring now to FIG. 2, FIG. 2 is a diagram of example components of a device 200. Device 200 may correspond to one or more devices of merchant system 102, one or more devices of payment gateway 104, one or more devices of acquirer system 106, one or more devices of transaction service provider system 108, one or more devices of issuer system 110, and/or payee device 112 (e.g., one or more devices of a system of payee device 112, etc.). In some non-limiting embodiments or aspects, one or more devices of merchant system 102, one or more devices of payment gateway 104, one or more devices of acquirer system 106, one or more devices of transaction service provider system 108, one or more devices of issuer system 110, and/or payee device 112 (e.g., one or more devices of a system of payee device 112, etc.) may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 (e.g., a central processing unit (CPU), a graphics processing unit (GPU), etc.) executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3A:
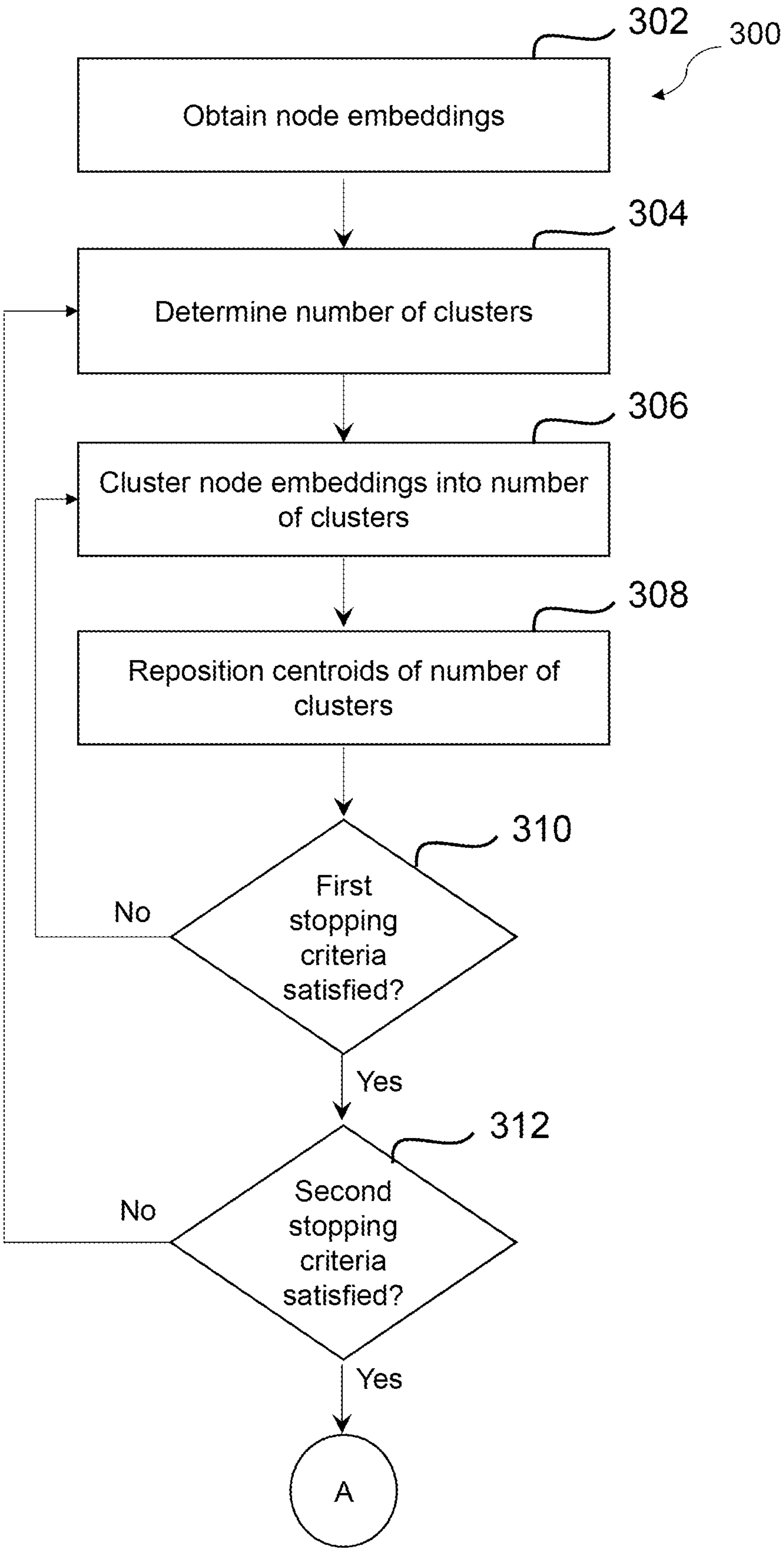
FIGS. 3A and 3B are a flowchart of non-limiting embodiments or aspects of a process for community detection.
Figure 3B:
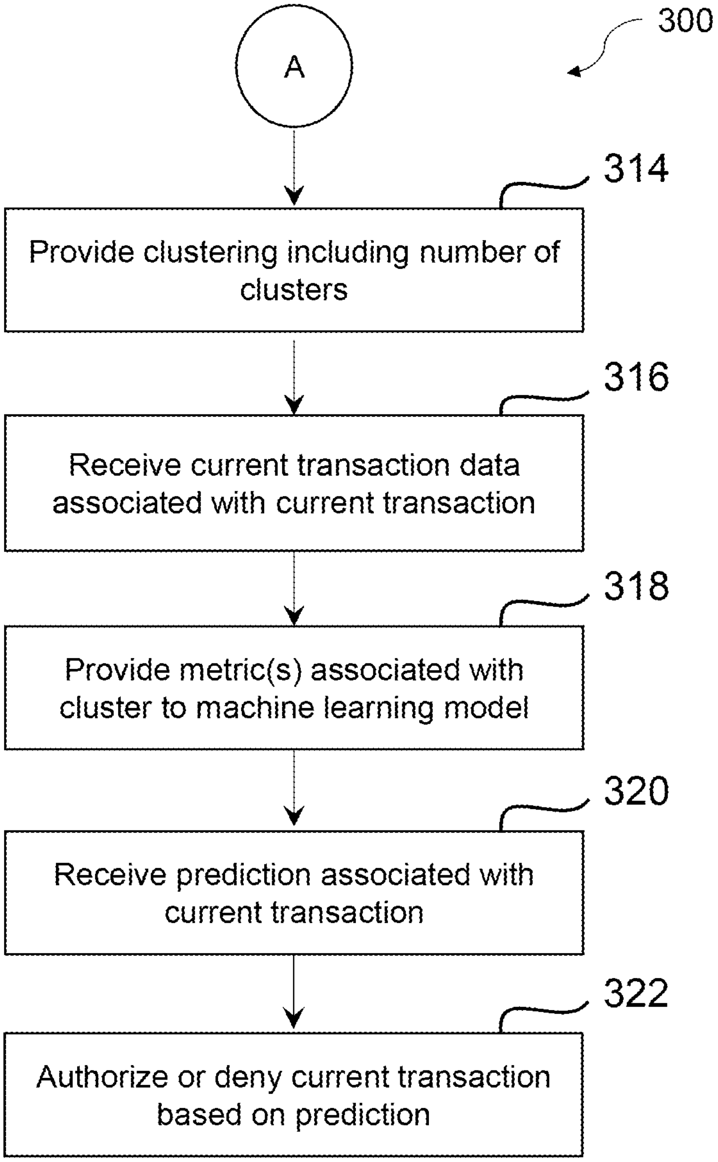

Referring now to FIGS. 3A and 3B, FIGS. 3A and 3B are a flowchart of non-limiting embodiments or aspects of a process 300 for community detection. In some non-limiting embodiments or aspects, one or more of the steps of process 300 may be performed (e.g., completely, partially, etc.) by transaction service provider system 108 (e.g., one or more devices of transaction service provider system 108). In some non-limiting embodiments or aspects, one or more of the steps of process 300 may be performed (e.g., completely, partially, etc.) by another device or a group of devices separate from or including transaction service provider system 108, such as, (e.g., one or more devices of merchant system 102), payment gateway 104 (e.g., one or more devices of payment gateway 104), acquirer system 106 (e.g., one or more devices of acquirer system 106, issuer system 110 (e.g., one or more devices of issuer system 110), and/or payee device 112.

As shown in FIG. 3A, at step 302, process 300 includes obtaining node embeddings. For example, transaction service provider system 108 may obtain node embeddings. As an example, transaction service provider system 108 may obtain a plurality of node embeddings associated with a graph including a plurality of edges and a plurality of nodes for the plurality of edges. In such an example, the plurality of nodes may be associated with a plurality of entities, and/or the plurality of edges may be associated with a plurality of relationships between the plurality of entities. In some non-limiting embodiments, the graph may represent a payment network (e.g., a real-time payment (RTP) network, a peer-to-peer (P2P) payment network, etc.) including the plurality of entities (e.g., accounts, payers, payees, etc.) with relationships or connections (e.g., transactions, etc.) between the plurality of entities represented by the plurality of edges. Further details regarding non-limiting embodiments or aspects of step 302 of process 300 are provided below with regard to FIG. 4.

Figure 4:
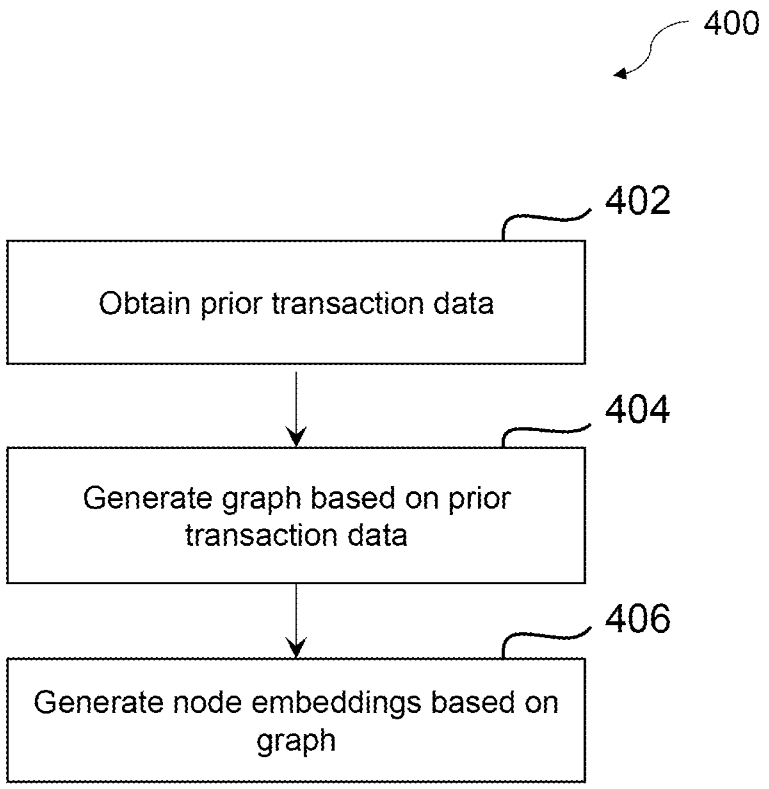
FIG. 4 is a flowchart of non-limiting embodiments or aspects of a process for generating node embeddings.

Referring also to FIG. 4, FIG. 4 is a flowchart of non-limiting embodiments or aspects of a process 400 for generating node embeddings. In some non-limiting embodiments or aspects, one or more of the steps of process 300 may be performed (e.g., completely, partially, etc.) by transaction service provider system 108 (e.g., one or more devices of transaction service provider system 108). In some non-limiting embodiments or aspects, one or more of the steps of process 300 may be performed (e.g., completely, partially, etc.) by another device or a group of devices separate from or including transaction service provider system 108, such as, (e.g., one or more devices of merchant system 102), payment gateway 104 (e.g., one or more devices of payment gateway 104), acquirer system 106 (e.g., one or more devices of acquirer system 106, issuer system 110 (e.g., one or more devices of issuer system 110), and/or payee device 112.

As shown in FIG. 4, at step 402, process 400 includes obtaining prior transaction data. For example, transaction service provider system 108 may obtain prior transaction data. As an example, transaction service provider system 108 may obtain prior transaction data associated with a plurality of prior transactions between the plurality of entities. In such an example, the graph may represent a payment network (e.g., a real-time payment (RTP) network, a peer-to-peer (P2P) payment network, etc.) including the plurality of entities (e.g., accounts, payers, payees, etc.) with transactions between the plurality of entities represented by the plurality of edges. For example, and referring also to FIG. 6, which is a diagram of non-limiting embodiments or aspects of a community detection framework, transaction service provider system 108 may obtain prior transaction data associated with raw transactions for a number x-month (or day, or week, or year, etc.) lookback period (e.g., one-month, six-months, a year, etc.).

As shown in FIG. 4, at step 404, process 400 includes generating a graph based on prior transaction data. For example, transaction service provider system 108 may generate a graph based on the prior transaction data. As an example, transaction service provider system 108 may generate, based on the prior transaction data, the graph. In such an example, the plurality of entities may be associated with a plurality of accounts in a payment network. For example, and referring again to FIG. 6, transaction service provider system 108 may generate, based on the prior transaction data associated with raw transactions for the number x-month lookback period (e.g., one-month, six-months, a year, etc.), a base graph for the payment network for the x-month lookback period.

A network (e.g., a payment network, etc.) may be represented by a graph $G=(V, E, W_E, R, A_{VR})$, where Vis a node set including the plurality of nodes, E is an edge set including the plurality of edges, $W_E$ is weights corresponding to edges of the edge set E, R is an attribute set, and $A_{VR}$ is a node-attribute association set. The notation may be simplified to G=(V, E) to focus on the graph.

A subgraph $g \subseteq G$ may be a partition of a graph G that retains the original network structure. A community may be a type of subgraph that represents a real social phenomenon, such as, people exchanging money with each other in a RTP network, and/or the like.

Communities may be subgraphs in which nodes share dense connections, but are sparsely connected to the rest of the network. Communities may be represented by $C=\{C_1, C_2, \ldots, C_m\}$, where $C_i$ is the $i^{th}$ community from the partition of the network graph G. A node v, $v \in V$, grouped into community $C_i$ may satisfy the condition that the internal degree of each node inside the community exceeds the external degree of that node. A goal of community detection may be to discover communities C in network G.

For applications related to a payment network, community detection using graph structure may only help identify spatio-temporally similar groups of accounts tailored on a single attribute type, namely, edges. However, the bad actors in a payment network may not always have an edge connecting the bad actors in order to reduce the chances of one bad actor getting caught letting to the other bad actor getting caught. For example, two accounts that are financial sponsors of terrorist activities in the world may not have any evident edge/connection between the two accounts, and existing community detection methods may not return the two accounts in a same high-risk community. Non-limiting embodiments or aspects of the disclosed subject matter may leverage a clustering based approach to address this deficiency.

Clusters are groups of data points (e.g., graph nodes such that data points in the same groups are more behaviorally similar to other data points in the same group than those in other groups, etc.). Clustering may be tailored to deal with multiple attribute types that essentially captures behavior of data points. Clusters may be represented by $D=\{D_1, D_2, \ldots, D_n\}$, where $D_j$ is the $j^{th}$ cluster of nodes from the network graph G in which the nodes may or may not be connected.

Figure 5:
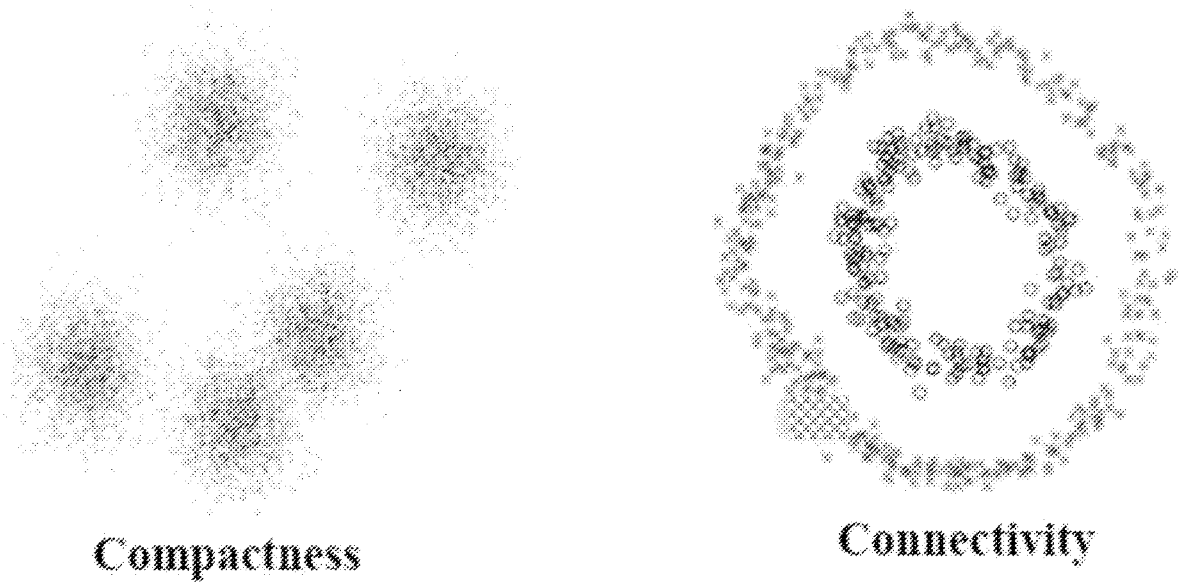
FIG. 5 illustrates a difference between compactness and connectivity.

Needless to say, clusters and communities are not the same thing. For example, and referring also to FIG. 5, which illustrates a difference between compactness and connectivity, clustering techniques may focus on optimizing compactness, which is the variance (e.g., the average of the squared distances to the mean, etc.) and community detection techniques may focus on optimizing connectivity, which is the modularity (e.g., measure of the density of connections in a graph within a module or community, etc.). Non-limiting embodiments or aspects of the disclosed subject matter may provide a solution that combines both compactness and connectivity.

Still referring to FIG. 4, at step 406, process 400 includes generating node embeddings based on a graph. For example, transaction service provider system 108 may generate node embeddings based on the graph. As an example, transaction service provider system 108 may generate, based on the graph, the plurality of node embeddings. In such an example, transaction service provider system 108 may generate, based on the graph, using one or more graph representation learning methods including deep graph embedding, the plurality of node embeddings. In such an example, transaction service provider system 108 may use at least one of the following graph representation learning methods to generate the node embeddings based on the graph: a heterogeneous method, a skew-aware method, a scalable method, and/or the like, the selection of which may depend on an amount of domain knowledge that is desired to be incorporated into the embeddings. For example, and referring again to FIG. 6, transaction service provider system 108 may provide, as input to a graph embedding neural network, the base graph for the payment network for the x-month lookback period and receive, as output from the graph embedding neural network, account level node embeddings for the payment network for the x-month lookback period. As an example, transaction service provider system 108 may store (e.g., in a memory, etc.) the account level node embeddings and/or the base graph and/or provide the account level node embeddings and/or the base graph to a community detection module.

Deep graph embedding is a technique that maps nodes in a network to a low dimensional vector space, while saving as much structural information as possible in the representations. Graph representation learning methods including deep graph embedding are described in the paper by Palash Goyal and Emilio Ferrara titled "Graph embedding techniques, applications, and performance: A survey" in the Journal of Knowledge-based Systems at 151:78-94 (2018), the disclosure of which is incorporated by reference herein in its entirety.

Given a network G=(V, E), a node embedding of G may be a mapping $f\ N \rightarrow \mathbb{R}^d$, where Nis a set of network nodes. The value d may be a parameter of the embedding referred to as the latent dimension of the output vector space. A goal of network embedding methods may be to maintain the relevant graph-topological properties in the obtained vector space as accurately as possible.

Traditionally, graph embedding focuses on individual nodes, but communities in networks reflect high-order proximities, such as, similar behavior, and/or the like. Existing community detection methods may not test ability of graph embedding techniques to detect communities and, regardless, these existing methods continue to optimize compactness as opposed to connectivity.

In traditional deep graph embedding-based community detection, clustering function F may take as input a set of embeddings and assign each embedding into a particular cluster (e.g., F may be a mapping from $\mathbb{R}^{|N| x d} \rightarrow \mathbb{N}^{|N|}$, etc.). Each element of the resulting vector of integers may represent the label of the cluster, assigned to the corresponding row of the input matrix.

Referring again to FIGS. 3A and 3B, as shown in FIG. 3A, at step 304, process 300 includes determining a number of clusters. For example, transaction service provider system 108 may determine a number of clusters. As an example, transaction service provider system 108 may determine a number of clusters into which the plurality of node embeddings is to be clustered. In such an example, transaction service provider system 108 may determine the number of clusters into which the plurality of node embeddings is to be clustered using the elbow-method and/or a Silhouette coefficient.

As shown in FIG. 3A, at step 306, process 300 includes clustering node embeddings into a number of clusters. For example, transaction service provider system 108 may cluster the node embeddings into the number of clusters. As an example, transaction service provider system 108 may cluster, based on distances between pairs of node embeddings in the plurality of node embeddings, the plurality of node embeddings into the number of clusters until, for each node embedding in each cluster, a node associated with that node embedding is within k-hops in the graph of each other node associated with each other node embedding in that cluster. In such an example, transaction service provider system 108 may use at least one of the following clustering methods to cluster the node embeddings into the number of clusters: k-means clustering, density-based spatial clustering of applications with noise (DBSCAN), overlapping k-means clustering, and/or the like.

Figure 7:
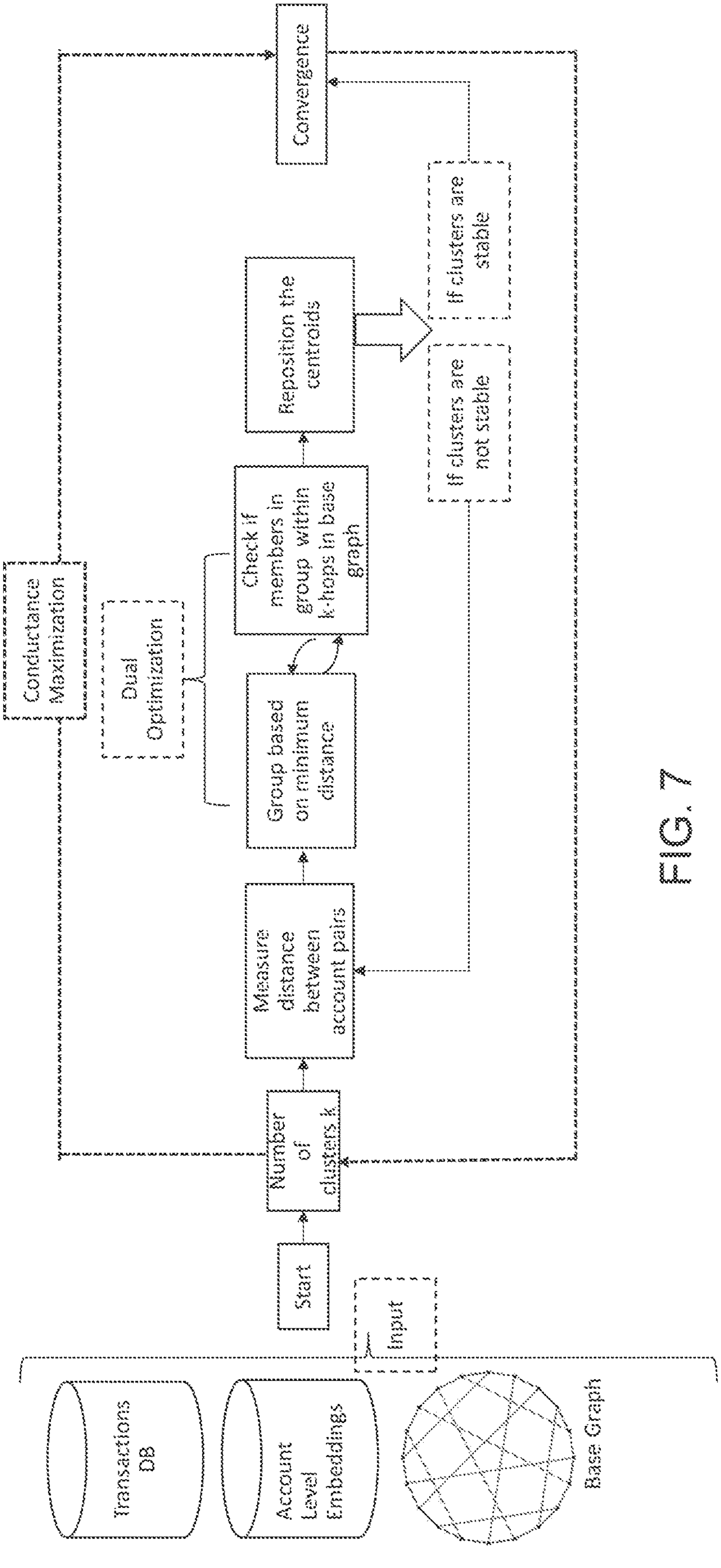
FIG. 7 is a diagram of non-limiting embodiments or aspects of a community detection module of a community detection framework.

For example, and referring also to FIG. 7, which is a diagram of non-limiting embodiments or aspects of a community detection module of community detection framework, transaction service provider system 108 may use the community detection module to optimize both connectivity and compactness during clustering by grouping based on minimum distance (e.g., by clustering nodes based on a measured distance between account pairs to find compact communities, etc.) followed by checking if the members in a group are within k-hops in the base graph (e.g., by determining if two nodes—found to be similar—are within k hops of each other in the base graph, etc.), thereby providing a dual optimization step in each iteration of step 306 that provides a lower bound to the solution of the primal (minimization) problem, e.g., grouping by distance. For simplicity of implementation, the duality gap may be framed as a constraint qualification condition and a greedy heuristic algorithm may be used for the task.

As shown in FIG. 3A, at step 308, process 300 includes repositioning centroids of a number of clusters. For example, transaction service provider system 108 may reposition centroids of the number of clusters. As an example, transaction service provider system 108 may determine an updated or repositioned centroid for each cluster of the number of clusters based on the node embeddings assigned to that cluster by the most recent iteration of step 306.

As shown in FIG. 3A, at step 310, process 300 includes repeating steps 306 and 308 of process 300 until a first stopping criteria is satisfied. For example, transaction service provider system 108 may repeat steps 306 and 308 of process 300 until a first stopping criteria is satisfied. As an example, and referring also to FIG. 7, transaction service provider system 108 may repeat steps 306 and 308 of process 300 until the clusters of the number of clusters are stable. If, after repositioning the centroids of the number of clusters in step 308, the clusters of the number of clusters are not stable, processing may return to step 306 of process 300. If, after repositioning the centroids of the number of clusters in step 308, the clusters of the number of clusters are stable, processing may proceed to step 312 of process 300. In such an example, the first stopping criteria may be satisfied when no node embeddings change clusters in step 306 from a previous iteration of step 306 (e.g., the clusters may be stable when no node embeddings change clusters in step 306 from a previous iteration of step 306).

As shown in FIG. 3A, at step 312, process 300 includes repeating steps 304 through 310 of process 300 until a second stopping criteria is satisfied. For example, and referring also to FIG. 7, transaction service provider system 108 may repeat steps 304 through 310 of process 300 until a second stopping criteria is satisfied. As an example, transaction service provider system 108 may repeat steps 304 through 310 of process 300 until a second stopping criteria that depends on a conductance of a clustering including the number of clusters is satisfied. If, after determining that the first stopping criteria is satisfied in step 310, the second stopping criteria is determined to not be satisfied, processing may return to step 304 of process 300. If, after determining that the first stopping criteria is satisfied in step 310, the second stopping criteria is determined be satisfied, processing may proceed to step 314 of process 300. In such an example, the second stopping criteria may be satisfied when the conductance of each cluster in the clustering is at least a threshold conductance and a weight of inter-cluster edges is at most a threshold fraction of a total weight of each of the edges in the graph.

A conductance of the graph G=(V, E) may include how fast a random walk on G converges to its stationary distribution, and the conductance of the clustering may include a maximum conductance over each cluster in the clustering. For example, the conductance $\phi(G)$ of the graph G may be defined as a minimum of the ratio of E(U, V U) to mind(U), d(VU) where d(U) is a sum of the weighted degrees on nodes in U, U and V being partitions of the graph G. The conductance of a clustering may be defined as the maximum conductance over all clusters in the clustering. A clustering may be an ($\alpha$, $\epsilon$)-clustering if the conductance of each cluster (in the clustering) is at least a and the weight of the inter-cluster edges is at most $\epsilon$ fraction of the total weight of all the edges in the graph G.

As shown in FIG. 3B, at step 314, process 300 includes providing a clustering including a number of clusters. For example, transaction service provider system 108 may provide the clustering including the number of clusters. As an example, transaction service provider system 108 may store (e.g., in a memory, etc.) the clustering including the number of clusters. As an example, transaction service provider system 108 may provide the clustering including the number of clusters and/or at least one metric determined based thereon as input to a machine learning model (e.g., an AI fraud detection model, etc.).

Accordingly, due to a dual optimization strategy, non-limiting embodiments or aspects of the disclosed subject matter may enable discovery of non-trivial, meaningful communities that are not simply connected components, which may be particularly useful for applications related to payment networks. Traditional community detection using graph connectivity structure can only help to identify spatio-temporally similar groups of accounts. Non-limiting embodiments or aspects of the disclosed subject matter can help to identify accounts with similar characteristics as well. For example, two accounts that are financial sponsors of terrorist activities may not have any evident edge/connection between the two accounts. Existing community detection methods may not return the two accounts in the same cluster; however, non-limiting embodiments or aspects of the disclosed subject matter provide a community detection module that can return these two accounts in the same cluster, thereby capturing a more meaningful and/or larger malicious group operating in the payment network. Additionally, non-limiting embodiments or aspects of the disclosed subject matter may leverage domain knowledge when building the node embeddings.

Further, due to a modular nature, non-limiting embodiments or aspects of the disclosed subject matter may capture overlapping communities by replacing k-means with a clustering algorithm that captures overlapping clusters. Overlapping communities is an aspect of applications related to payment networks because the same account can be part of multiple malicious groups, such as a money mule fraud, a poker ring, and a Ponzi scheme. Moreover, non-limiting embodiments or aspects of the disclosed subject matter may be applied to heterogeneous graphs, scale well, and/or leverage domain knowledge by using the network graph to generate node embeddings.

As shown in FIG. 3B, at step 316, process 300 includes receiving current transaction data associated with a current transaction. For example, transaction service provider system 108 may receive current transaction data associated with a current transaction. As an example, transaction service provider system 108 may receive current transaction data associated with a current transaction associated with an account in the payment network.

Transaction data may include parameters associated with a transaction, such as an account identifier (e.g., a receiving or payee account identifier, a sending or payer account identifier, etc.), a transaction amount, a transaction date and time, a type of currency, a payee location, a payer location, and/or the like.

As shown in FIG. 3B, at step 318, process 300 includes providing at least one metric associated with a cluster to a machine learning model. For example, transaction service provider system 108 may provide at least one metric associated with a cluster to a machine learning model. As an example, transaction service provider system 108 may provide, as input to a machine learning model, at least one metric associated with a cluster of the number of clusters in which a node embedding associated with the account is clustered (and/or one or more parameters of the transaction data associated with the current transaction). In such an example, the machine learning model may include a fraud detection model, a money mule scoring model, an authentication model, such as Visa Consumer Authentication Service (VCAS), a non-compliance detection model for real-time payment (RTP) risk as a service (RAAS), a model to detect collusive and/or risky blockchain or crypto communities, and/or the like.

The at least one metric may include at least one of the following metrics: a number of accounts associated with the cluster (e.g., a size of the community, etc.), a monetary amount of transactions associated with the accounts associated with the cluster (e.g., a sum, an average, a maximum, and/or a minimum amount of money flow by accounts in the community, etc.), a number of transactions associated with the accounts associated with the cluster (e.g., a sum, an average, a maximum, and/or a minimum of transaction activities by accounts in the community, etc.), a community activity score determined based on transaction amounts and transaction counts associated with the accounts associated with the cluster, a community recency score determined based on an average age of the accounts associated with the cluster, a community instability score determined based on a percentage of the accounts that are consistent in the cluster over a period of time, or any combination thereof. For example, the at least one metric may be input as at least one feature to the machine learning model (e.g., a fraud detection module, a money mule scoring module, a VCAS, etc.) to improve the model quality.

Community risk scores may help with detecting regular/low-risk and/or suspicious/high-risk communities of accounts. The community activity score may leverage transaction amount and count. For example, the community activity score may include a ratio of a difference between a highest and a lowest daily money flow by accounts in a community to an average activity by the accounts in the community (e.g., (highest daily money flow-lowest daily money flow)/average activity, etc.). The community recency score may leverage active ages of accounts. For example, the community recency score may include an average age of accounts in a community. The community instability score may leverage consistency in behavior of accounts. For example, the community instability score may include a percentage of accounts that are inconsistent (or consistent) in a community over a period of time. In this way, a high community activity score, a high community recency score, and a high community instability score may indicate that community suspiciousness is high for the community in which the account is included.

As shown in FIG. 3B, at step 320, process 300 includes receiving a prediction associated with a current transaction. For example, transaction service provider system 108 may receive a prediction associated with the current transaction. As an example, transaction service provider system 108 may receive, as output from the machine learning model, a prediction associated with the current transaction. In such an example, the prediction may include a probability that the current transaction is a fraudulent transaction. In such an example, the prediction may include a probability that the current transaction is associated with a suspicious/high-risk community of accounts.

As shown in FIG. 3B, at step 322, process 300 includes authorizing or denying a current transaction based on a prediction. For example, transaction service provider system 108 may authorize or deny the current transaction based on the prediction. As an example, transaction service provider system 108 may automatically deny the current transaction if the prediction indicates that the transaction is a fraudulent transaction (e.g., if the probability satisfies a threshold probability, etc.). As an example, transaction service provider system 108 may automatically authorize the current transaction if the prediction indicates that the transaction is not a fraudulent transaction (e.g., if the probability fails to satisfy a threshold probability, etc.). As an example, transaction service provider system 108 may automatically perform an account validation of the account (and/or the other accounts in that account's community) if the prediction indicates that the transaction is associated with a suspicious/high-risk community of accounts (e.g., if the probability satisfies a threshold probability, etc.). As an example, transaction service provider system 108 may not perform an account validation of the account if the prediction indicates that the transaction is not associated with a suspicious/high-risk community of accounts (e.g., if the probability fails to satisfy a threshold probability, etc.). An account validation or instant bank verification may include a process of automatically verifying (e.g., with a financial institution or issuer system 110 that issued an account, etc.) that the account number and account details of an account are valid before the current transaction is processed. Accordingly, non-limiting embodiments or aspects of the present disclosure may save computing resources by initiating account validation only for those accounts identified as associated with a suspicious/high-risk community of accounts.

Referring now to FIGS. 8A-8D, FIGS. 8A-8D illustrate an implementation of non-limiting embodiments or aspects of a process for community detection.

A fraudulent transaction may be identified by a machine learning process and/or an analyst at a financial institution. For example, transaction details of the transaction may include the following transaction parameters: Sender: 12000197000026587 (customer); Receiver: 12000197000213124 (customer); Date/Time: 2020 Dec. 3, 22:22:52; and Amount: $1700. Non-limiting embodiments or aspects of the disclosed subject matter may be used to determine whether the fraudulent transaction is a high-risk money flow (e.g., a transaction associated with high-risk paths and/or high-risk accounts, etc.).

Figure 6:
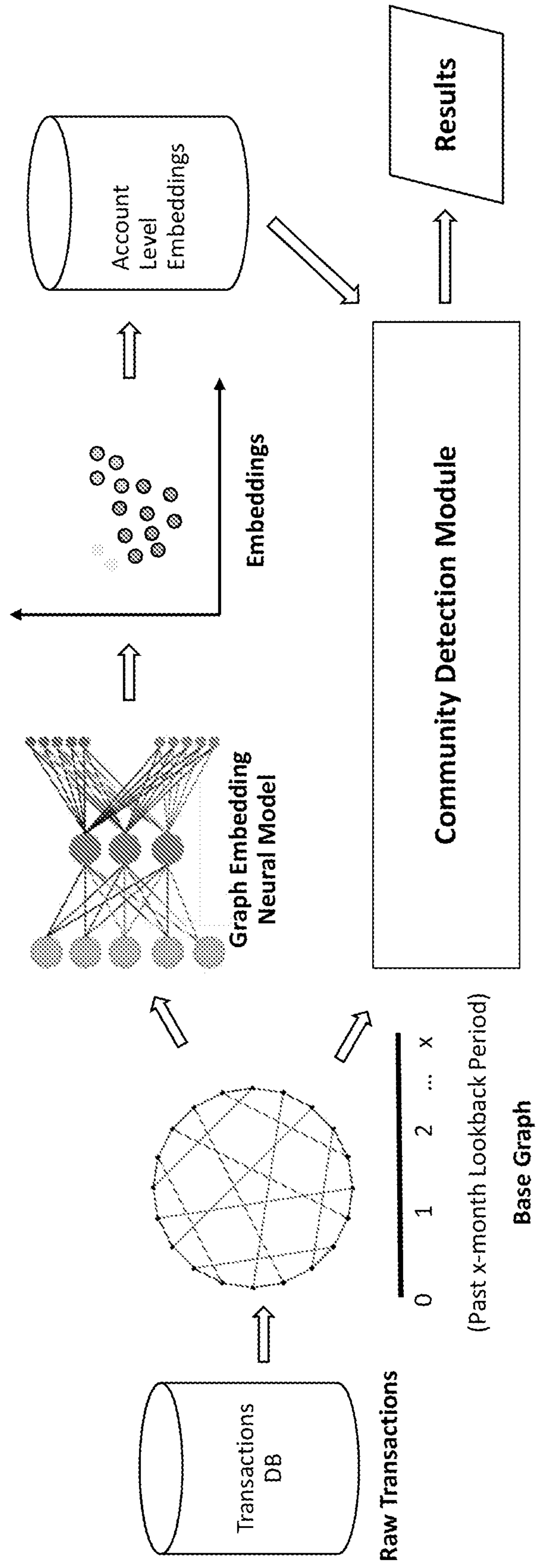
FIG. 6 is a diagram of non-limiting embodiments or aspects of a community detection framework.
Figure 8A:
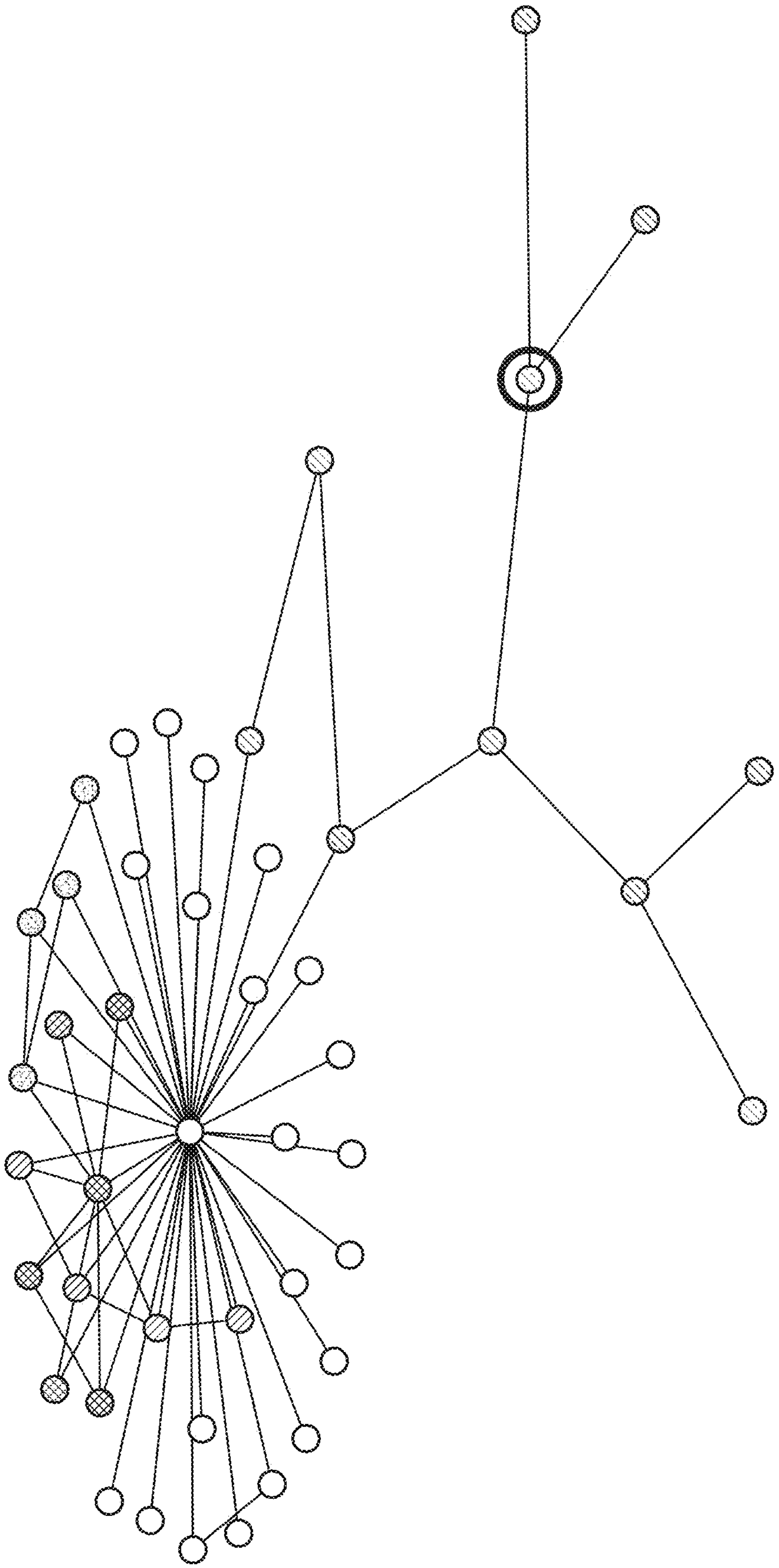
FIGS. 8A-8D illustrate an implementation of non-limiting embodiments or aspects of a process for community detection.
Figure 8B:
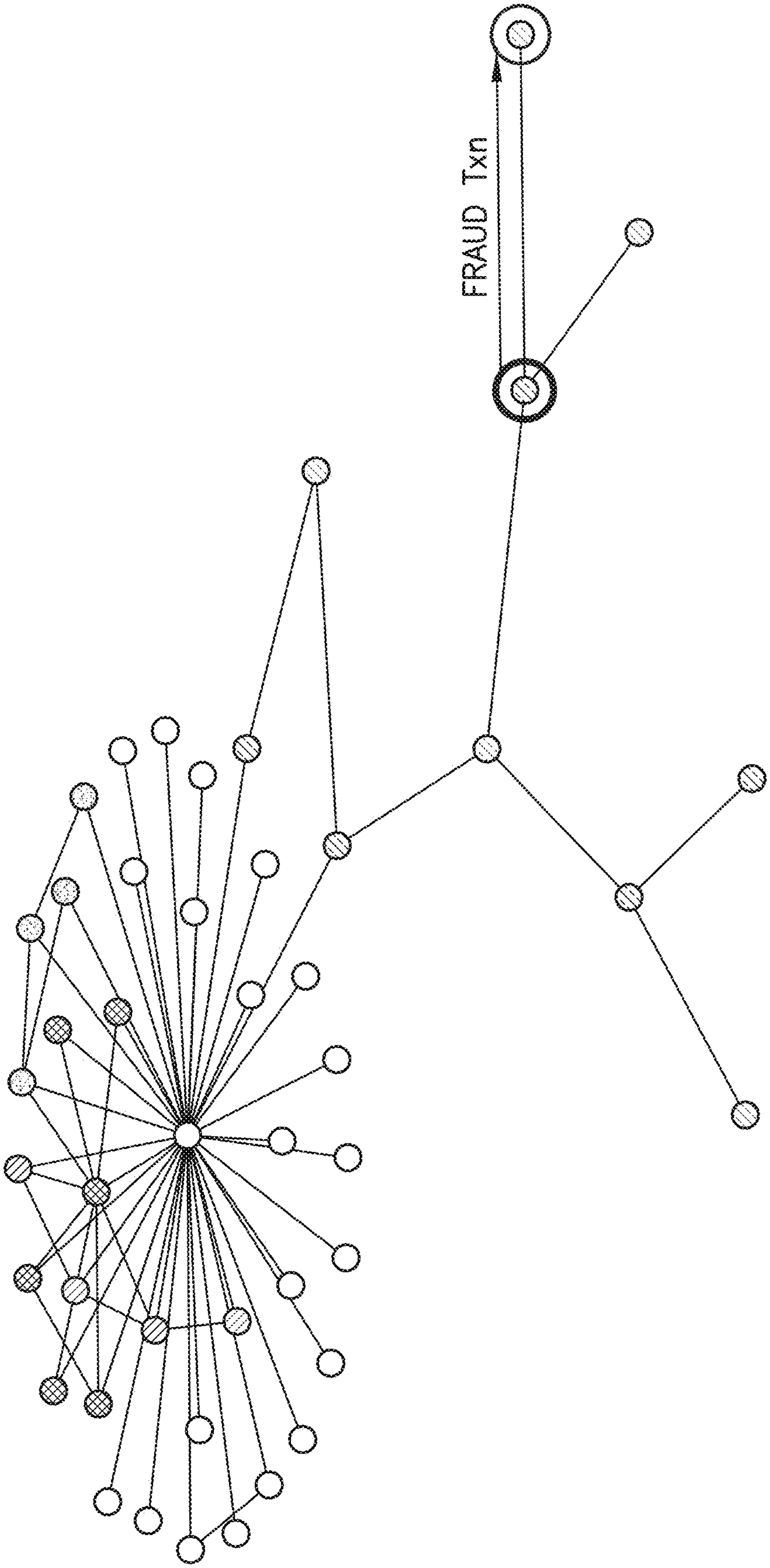
Figure 8C:
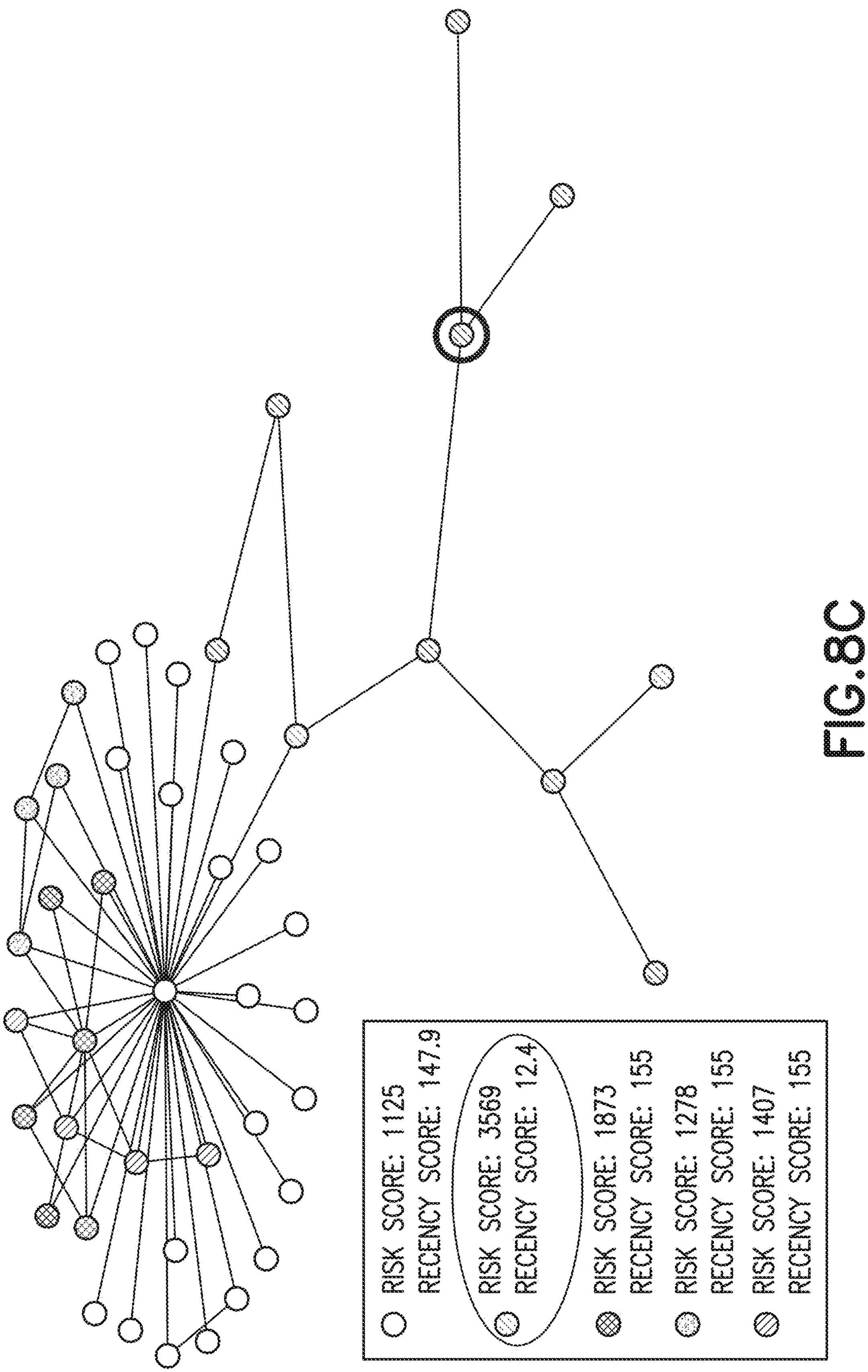
Figure 8D:
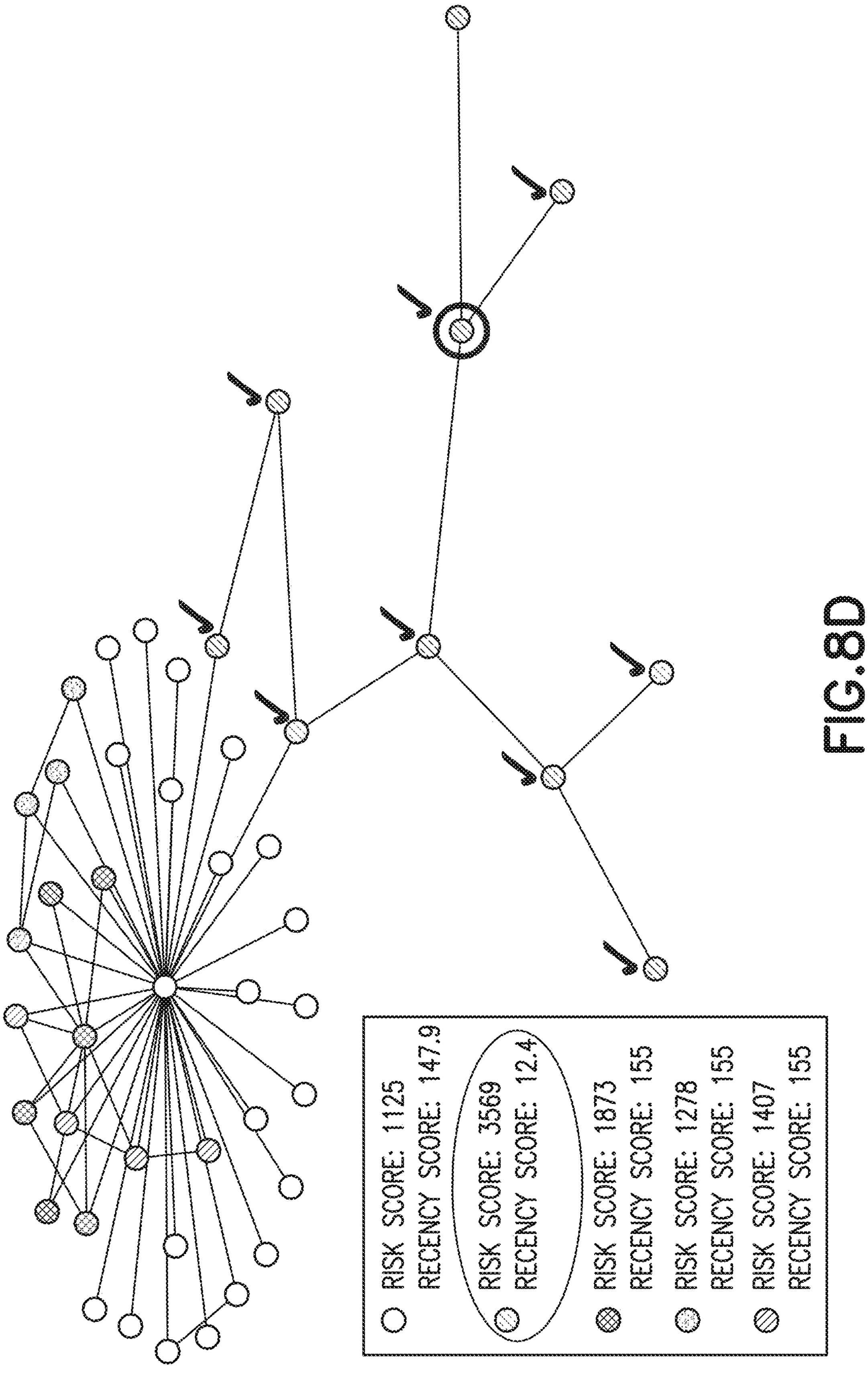

FIGS. 8A and 8B illustrate communities detected by non-limiting embodiments or aspects of an implementation of a community detection module (e.g., as illustrated in FIGS. 6 and 7) that detects five short-term communities (different communities indicated by different levels of shading in FIGS. 8A-8D) for transactions in a past 5 days by four-hop neighbors from the Sender account (circled in FIGS. 8A-8D) associated with the fraudulent transaction. After identifying the five communities (e.g., the clustering, etc.), transaction service provider system 108 may determine one or more community risk scores for the communities including the community in which the Sender account associated with the fraudulent transaction is located, which may help with detecting regular/low-risk and/or suspicious/high-risk communities of accounts. For example, as shown in FIG. 8C, transaction service provider system 108 may determine a community activity score and a community recency score for the community in which the Sender account associated with the fraudulent transaction is located. As shown in FIG. 8D, transaction service provider system 108 may identify, based on the community risk scores, high-risk paths and/or high-risk accounts (identified by checkmarks in FIG. 8D) and perform an account validation of each of these accounts in response to the accounts being identified as high-risk accounts.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method, comprising:

obtaining, with at least one processor of a transaction service provider system in an electronic payment network, prior transaction data associated with a plurality of prior transactions between a plurality of entities associated with a plurality of accounts in the electronic payment network, wherein the electronic payment network includes at least one of a real-time payment (RTP) network or a peer-to-peer (P2P) payment network;

generating, with the at least one processor, based on the prior transaction data, a graph including a plurality of edges and a plurality of nodes for the plurality of edges, wherein the plurality of nodes is associated with the plurality of entities associated with the plurality of accounts, and wherein the plurality of edges is associated with a plurality of transactions in the electronic payment network between the plurality of entities associated with the plurality of accounts;

(i) generating, with the at least one processor, using a graph embedding neural network, based on the graph, a plurality of node embeddings associated with the graph, wherein generating the plurality of node embeddings includes using a graph representation learning method including deep graph embedding, and wherein the graph representation learning method includes at least one of: a heterogeneous method, a skew-aware method, or a scalable method, selected based on an amount of domain knowledge to be incorporated into the plurality of node embeddings;

(ii) determining, with the at least one processor, a number of clusters into which the plurality of node embeddings is to be clustered;

(iii) clustering, with the at least one processor, based on distances between pairs of node embeddings in the plurality of node embeddings, the plurality of node embeddings into the number of clusters until, for each node embedding in each cluster, a node associated with that node embedding is within k-hops in the graph of each other node associated with each other node embedding in that cluster;

(iv) repositioning, with the at least one processor, centroids of the number of clusters;

(v) repeating, with the at least one processor, steps (iii) and (iv) until a first stopping criteria is satisfied, wherein the first stopping criteria is satisfied when no node embeddings change clusters in step (iii) from a previous iteration of step (iii);

(vi) repeating, with the at least one processor, steps (ii) through (v) until a second stopping criteria that depends on a conductance of a clustering including the number of clusters is satisfied, wherein the conductance of the clustering includes a maximum conductance over each cluster in the clustering, and wherein the second stopping criteria is satisfied when the conductance of each cluster in the clustering is at least a threshold conductance and a weight of inter-cluster edges is at most a threshold fraction of a total weight of each of the edges in the graph;

(vii) providing, with the at least one processor, the clustering including the number of clusters;

receiving, with the at least one processor, current transaction data associated with a current transaction associated with an account of the plurality of accounts in the electronic payment network, wherein the current transaction data includes an account identifier and at least one of: a transaction amount, a transaction date and time, a currency type, a sender identifier, a receiver identifier, or any combination thereof, and wherein the receiving of the current transaction data occurs in connection with generating a real-time inference before the current transaction is authorized in the electronic payment network;

providing, with the at least one processor, as input to a machine learning model, at least one parameter of the current transaction data and at least one metric associated with a cluster of the number of clusters in which a node embedding associated with the account is clustered, wherein the at least one metric includes at least one of: (a) a number of accounts associated with the cluster, (b) a monetary amount of transactions associated with the accounts associated with the cluster, (c) a number of transactions associated with the accounts associated with the cluster, (d) a community activity score determined based on transaction amounts and transaction counts associated with the accounts associated with the cluster, (e) a community recency score determined based on an average age of the accounts associated with the cluster, (f) a community instability score determined based on a percentage of the accounts that are consistent in the cluster over a period of time, or (g) any combination thereof;

receiving, with the at least one processor, as output from the machine learning model, a prediction associated with the current transaction;

in response to the prediction indicating that the current transaction is associated with a suspicious/high-risk cluster or community of accounts, automatically performing an account validation of the account before the current transaction is processed for authorization, wherein the account validation includes automatically verifying, with a financial institution or an issuer system that issued the account, that an account number and account details of the account are valid, and in response to the prediction indicating that the current transaction is not associated with the suspicious/high-risk cluster or community of accounts, not performing the account validation of the account; and automatically denying the current transaction when the prediction satisfies a threshold probability, and otherwise authorizing the current transaction, in the electronic payment network.

2. A system, comprising:

at least one processor of a transaction service provider system in an electronic payment network, the at least one processor configured to:

obtain prior transaction data associated with a plurality of prior transactions between a plurality of entities associated with a plurality of accounts in the electronic payment network, wherein the electronic payment network includes at least one of a real-time payment (RTP) network or a peer-to-peer (P2P) payment network;

generate, based on the prior transaction data, a graph including a plurality of edges and a plurality of nodes for the plurality of edges, wherein the plurality of nodes is associated with the plurality of entities associated with the plurality of accounts, and wherein the plurality of edges is associated with a plurality of transactions in the electronic payment network between the plurality of entities associated with the plurality of accounts;

(i) generate, using a graph embedding neural network, based on the graph, a plurality of node embeddings associated with the graph, wherein generating the plurality of node embeddings includes using a graph representation learning method including deep graph embedding, and wherein the graph representation learning method includes at least one of: a heterogeneous method, a skew-aware method, or a scalable method, selected based on an amount of domain knowledge to be incorporated into the plurality of node embeddings;

(ii) determine a number of clusters into which the plurality of node embeddings is to be clustered;

(iii) cluster, based on distances between pairs of node embeddings in the plurality of node embeddings, the plurality of node embeddings into the number of clusters until, for each node embedding in each cluster, a node associated with that node embedding is within k-hops in the graph of each other node associated with each other node embedding in that cluster;

(iv) reposition centroids of the number of clusters;

(v) repeat steps (iii) and (iv) until a first stopping criteria is satisfied, wherein the first stopping criteria is satisfied when no node embeddings change clusters in step (iii) from a previous iteration of step (iii);

(vi) repeat steps (ii) through (v) until a second stopping criteria that depends on a conductance of a clustering including the number of clusters is satisfied, wherein the conductance of the clustering includes a maximum conductance over each cluster in the clustering, and wherein the second stopping criteria is satisfied when the conductance of each cluster in the clustering is at least a threshold conductance and a weight of inter-cluster edges is at most a threshold fraction of a total weight of each of the edges in the graph;

(vii) provide the clustering including the number of clusters;

receive current transaction data associated with a current transaction associated with an account of the plurality of accounts in the electronic payment network, wherein the current transaction data includes an account identifier and at least one of: a transaction amount, a transaction date and time, a currency type, a sender identifier, a receiver identifier, or any combination thereof, and wherein the receiving of the current transaction data occurs in connection with generating a real-time inference before the current transaction is authorized in the electronic payment network;

provide as input to a machine learning model, at least one parameter of the current transaction data and at least one metric associated with a cluster of the number of clusters in which a node embedding associated with the account is clustered, wherein the at least one metric includes at least one of: (a) a number of accounts associated with the cluster, (b) a monetary amount of transactions associated with the accounts associated with the cluster, (c) a number of transactions associated with the accounts associated with the cluster, (d) a community activity score determined based on transaction amounts and transaction counts associated with the accounts associated with the cluster, (e) a community recency score determined based on an average age of the accounts associated with the cluster, (f) a community instability score determined based on a percentage of the accounts that are consistent in the cluster over a period of time, or (g) any combination thereof;

receive, as output from the machine learning model, a prediction associated with the current transaction;

in response to the prediction indicating that the current transaction is associated with a suspicious/high-risk cluster or community of accounts, automatically perform an account validation of the account before the current transaction is processed for authorization, wherein the account validation includes automatically verifying, with a financial institution or an issuer system that issued the account, that an account number and account details of the account are valid, and in response to the prediction indicating that the current transaction is not associated with the suspicious/high-risk cluster or community of accounts, not performing the account validation of the account; and automatically deny the current transaction when the prediction satisfies a threshold probability, and otherwise authorizing the current transaction, in the electronic payment network.

3. A computer program product comprising at least one non-transitory computer-readable medium including program instructions that, when executed by at least one processor of a transaction service provider system in an electronic payment network, cause the at least one processor to:

obtain prior transaction data associated with a plurality of prior transactions between a plurality of entities associated with a plurality of accounts in the electronic payment network, wherein the electronic payment network includes at least one of a real-time payment (RTP) network or a peer-to-peer (P2P) payment network;

generate, based on the prior transaction data, a graph including a plurality of edges and a plurality of nodes for the plurality of edges, wherein the plurality of nodes is associated with the plurality of entities associated with the plurality of accounts, and wherein the plurality of edges is associated with a plurality of transactions in the electronic payment network between the plurality of entities associated with the plurality of accounts;

(i) generate, using a graph embedding neural network, based on the graph, a plurality of node embeddings associated with the graph, wherein generating the plurality of node embeddings includes using a graph representation learning method including deep graph embedding, and wherein the graph representation learning method includes at least one of: a heterogeneous method, a skew-aware method, or a scalable method, selected based on an amount of domain knowledge to be incorporated into the plurality of node embeddings;

(ii) determine a number of clusters into which the plurality of node embeddings is to be clustered;

(iii) cluster, based on distances between pairs of node embeddings in the plurality of node embeddings, the plurality of node embeddings into the number of clusters until, for each node embedding in each cluster, a node associated with that node embedding is within k-hops in the graph of each other node associated with each other node embedding in that cluster;

(iv) reposition centroids of the number of clusters;

(v) repeat steps (iii) and (iv) until a first stopping criteria is satisfied, wherein the first stopping criteria is satisfied when no node embeddings change clusters in step (iii) from a previous iteration of step (iii);

(vi) repeat steps (ii) through (v) until a second stopping criteria that depends on a conductance of a clustering including the number of clusters is satisfied, wherein the conductance of the clustering includes a maximum conductance over each cluster in the clustering, and wherein the second stopping criteria is satisfied when the conductance of each cluster in the clustering is at least a threshold conductance and a weight of inter-cluster edges is at most a threshold fraction of a total weight of each of the edges in the graph;

(vii) provide the clustering including the number of clusters;

receive current transaction data associated with a current transaction associated with an account of the plurality of accounts in the electronic payment network, wherein the current transaction data includes an account identifier and at least one of: a transaction amount, a transaction date and time, a currency type, a sender identifier, a receiver identifier, or any combination thereof, and wherein the receiving of the current transaction data occurs in connection with generating a real-time inference before the current transaction is authorized in the electronic payment network;

provide, as input to a machine learning model, at least one parameter of the current transaction data and at least one metric associated with a cluster of the number of clusters in which a node embedding associated with the account is clustered, wherein the at least one metric includes at least one of: (a) a number of accounts associated with the cluster, (b) a monetary amount of transactions associated with the accounts associated with the cluster, (c) a number of transactions associated with the accounts associated with the cluster, (d) a community activity score determined based on transaction amounts and transaction counts associated with the accounts associated with the cluster, (e) a community recency score determined based on an average age of the accounts associated with the cluster, (f) a community instability score determined based on a percentage of the accounts that are consistent in the cluster over a period of time, or (g) any combination thereof;

receive, as output from the machine learning model, a prediction associated with the current transaction;

in response to the prediction indicating that the current transaction is associated with a suspicious/high-risk cluster or community of accounts, automatically perform an account validation of the account before the current transaction is processed for authorization, wherein the account validation includes automatically verifying, with a financial institution or an issuer system that issued the account, that an account number and account details of the account are valid, and in response to the prediction indicating that the current transaction is not associated with the suspicious/high-risk cluster or community of accounts, not performing the account validation of the account; and automatically deny the current transaction when the prediction satisfies a threshold probability, and otherwise authorizing the current transaction, in the electronic payment network.

* * * * *